(12) United States Patent
Litvak et al.

(10) Patent No.: US 12,373,696 B2
(45) Date of Patent: Jul. 29, 2025

(54) NEURAL NETWORK HARDWARE ACCELERATOR SYSTEM WITH ZERO-SKIPPING AND HIERARCHICAL STRUCTURED PRUNING METHODS

(71) Applicant: SAMSUNG ELECTRONICS CO., LTD., Suwon-si (KR)

(72) Inventors: Shai Litvak, Beit Hashmonai (IL); Eyal Hochberg, Ramat Gan (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1223 days.

(21) Appl. No.: 16/449,009

(22) Filed: Jun. 21, 2019

(65) Prior Publication Data

US 2020/0401895 A1    Dec. 24, 2020

(51) Int. Cl.
  *G06N 3/082*    (2023.01)
  *G06F 7/544*    (2006.01)
  (Continued)

(52) U.S. Cl.
  CPC .......... *G06N 3/082* (2013.01); *G06F 7/5443* (2013.01); *G06F 17/15* (2013.01); *G06N 3/02* (2013.01); *G06N 3/063* (2013.01); *G06N 3/084* (2013.01)

(58) Field of Classification Search
  CPC ...... G06F 7/5443; G06F 17/15; G06F 17/153; G06N 3/02; G06N 3/04; G06N 3/0454; G06N 3/063; G06N 3/082; G06N 3/084
  See application file for complete search history.

(56) References Cited

U.S. PATENT DOCUMENTS 11,200,495 B2 * 12/2021 Wang .................. G06N 3/082
2016/0358069 A1   12/2016 Brothers et al.
(Continued)

FOREIGN PATENT DOCUMENTS

KR   10-2018-0034853 A   4/2018
KR       10-1989793 B1   6/2019

OTHER PUBLICATIONS

He, Y. et al., "Channel Pruning for Accelerating Very Deep Neural Networks" Proceedings of the IEEE International Conference on Computer Vision (ICCV), 2017, pp. 1389-1397 (Year: 2017).*
(Continued)

*Primary Examiner* — Alexey Shmatov
*Assistant Examiner* — Devika S Maharaj
(74) *Attorney, Agent, or Firm* — MORGAN, LEWIS & BOCKIUS LLP

(57) ABSTRACT

Systems and methods for structured-pruning, zero-skipping and accelerated processing of an artificial neural network (ANN) are described. The ANN may include one or more convolution layers. 2D channels in filters of the convolution layers comprise fully pruned channels (FPCs), each containing only zero weights, and mixed channels (MCs), each containing at least one non-zero weight. At least a portion of the MCs satisfy a limited zero sequence (LZS) condition limiting the number and location of zeroes in the MC. The LZS condition may be based on a number of weights that a zero-skipping circuit of a computing system for processing the ANN is configured to evaluate and skip in a single cycle. Thus, when processing the structurally-pruned ANN using the zero-skipping method, the computing system may avoid processing zero weights. This may allow speeding up the ANN processing and reducing the power required for processing.

15 Claims, 17 Drawing Sheets

(51) Int. Cl.
  *G06F 17/15*   (2006.01)
  *G06N 3/02*   (2006.01)
  *G06N 3/063*   (2023.01)
  *G06N 3/084*   (2023.01)

(56) References Cited

U.S. PATENT DOCUMENTS

| | | | |
|---|---|---|---|
| 2018/0046898 A1 | 2/2018 | Lo | |
| 2018/0046916 A1* | 2/2018 | Dally | G06F 7/523 |
| 2018/0089562 A1 | 3/2018 | Jin et al. | |
| 2019/0108436 A1* | 4/2019 | David | G06N 3/02 |
| 2019/0147327 A1* | 5/2019 | Martin | G06N 3/0464 |
| | | | 706/15 |
| 2019/0303757 A1* | 10/2019 | Wang | G06F 9/5027 |
| 2020/0285950 A1* | 9/2020 | Baum | G06N 3/04 |
| 2020/0293876 A1* | 9/2020 | Phan | H03M 7/702 |
| 2021/0027166 A1* | 1/2021 | Gorokhov | G06N 3/0481 |
| 2021/0097393 A1* | 4/2021 | Wang | G06N 3/0454 |

OTHER PUBLICATIONS

Molchanov, P. et al., "Pruning Convolutional Neural Networks for Resource Efficient Inference" (Year: 2017).*
Parashar, A. et al., "SCNN: An Accelerator for Compressed-sparse Convolutional Neural Networks" (Year: 2017).*
Aghasi, A. et al., "Net-Trim: Convex Pruning of Deep Neural Networks with Performance Guarantee" 31st Conference on Neural Information Processing Systems (NIPS 2017), Long Beach, CA, USA. (Year: 2017).*
Anwar, S. et al., "Structured Pruning of Deep Convolutional Neural Networks" ACMJournal on Emerging Technologies in Computing Systems, vol. 13, No. 3, Article 32, Publication date: Feb. 2017. (Year: 2017).*
Li, H. et al., "Pruning Filters for Efficient ConvNets" (Year: 2017).*
Gao, X. et al., "Dynamic Channel Pruning: Feature Boosting and Suppression" (Year: 2019).*
Hu, H. et al., "Network Trimming: A Data-Driven Neuron Pruning Approach towards Efficient Deep Architectures", (Year: 2016).*
Hegde, K. et al., "UCNN: Exploiting Computational Reuse in Deep Neural Networks via Weight Repetition", https://arxiv.org/abs/1804.06508 (Year: 2018).*
Kim, D. et al., "ZeNA: Zero-Aware Neural Network Accelerator", https://ieeexplore.ieee.org/document/8013151 (Year: 2017).*
Gao, C. et al. "DeltaRNN: A Power-efficient Recurrent Neural Network Accelerator", https://dl.acm.org/doi/10.1145/3174243.3174261 (Year: 2018).*
Park, H. et al., "Zero and Data Reuse-aware Fast Convolution for Deep Neural Networks on GPU", https://dl.acm.org/doi/abs/10.1145/2968456.2968476 (Year: 2016).*
Han, S. et al., "Deep Compression: Compressing Deep Neural Networks with Pruning, Trained Quantization, and Huffman Coding", https://arxiv.org/abs/1510.00149 (Year: 2016).*
Frankle, J. et al., "The Lottery Ticket Hypothesis: Finding Sparse, Trainable Neural Networks", https://arxiv.org/abs/1803.03635 (Year: 2019).*
Thomas Epelbaum, "Deep learning: Technical introduction", Mediamobile, Sep. 12, 2017 (106 pages).
J. Cheng, et al. "Recent Advances in Efficient Computation of Deep Convolutional Neural Networks", Frontiers of Information Technology & Electronic Engineering, vol. 19, No. 1, pp. 64-77, 2018.
S. Han, et al., "Deep Compression: Compressing Deep Neural Networks With Pruning, Trained Quantization and Huffman Coding", ICLR 2016, pp. 1-14.
D. Kim et al., A Novel Zero Weight/Activation-Aware Hardware Architecture of Convolutional Neural Network, 2017 Design, Automation and Test in Europe, (Mar. 27, 2017), pp. 1462-1467.
Yang et al., "Thinning of convolutional neural network with mixed pruning", IET Image Process., 2019, vol. 13 Iss. 5, pp. 779-784 (Jan. 17, 2019).
Office Action dated Aug. 23, 2024 in Korean Patent Application No. 10-2020-0016899, 13 pages (in Korean).

\* cited by examiner

FPC

MC

NEURAL NETWORK HARDWARE ACCELERATOR SYSTEM WITH ZERO-SKIPPING AND HIERARCHICAL STRUCTURED PRUNING METHODS

BACKGROUND

The following relates generally to processing an artificial neural network (ANN), and more specifically to structured pruning and zero-skipping of zero weights of an ANN.

ANN models may be used in processing rich and complex data in various domains including computer vision, speech recognition, natural language processing, video analysis, medical imaging and diagnostics, stock market predication, autonomous driving, robot navigation, etc. Processing ANNs may involve a large number of computations, which justifies special consideration of computational efficiency.

Different aspects of computational efficiency may be more relevant for different applications. For example, power optimization may be a significant concern when implementing ANNs on a mobile phone (i.e., due to limited battery). On the other hand, computation speed may be more important for autonomous driving purposes, as short latency may be essential to guarantee a quick response to events on the road. Therefore, there is a need in the art for systems and methods to process ANNs more efficiently with regard to both computational speed and latency.

SUMMARY

Embodiments of the disclosure describe a hierarchically sparse convolution neural network (CNN) model, a process for producing such a model, and systems configured to efficiently process it. A structured pruning method is described that maintains the shape and size of the original trained artificial neural network (ANN), but produces a new set of weights with a high rate of zeros distributed in a hierarchically structured manner. Additionally, convolution accelerator (CA) hardware is described for speeding up the inference processing while skipping the processing of zeros of a structurally pruned ANN.

A computing system for processing an ANN is described. The computing system may include a processor comprising a zero-skipping circuit configured to locate non-zero weights, a memory, and an ANN stored within the memory, wherein the ANN comprises a plurality of layers including one or more convolution layers, wherein each of the one or more convolution layers comprises a plurality of filters, each filter comprises a plurality of channels, each channel comprises a plurality of rows, and each row comprises a plurality of weights, wherein the plurality of channels in the one or more convolution layers comprises one or more fully pruned channel (FPCs) and one or more mixed 2D channel (MCs), wherein each of the one or more FPCs comprises only zero weights and each of the one or more MCs comprises at least one non-zero weight, and wherein at least a portion of the one or more MCs satisfy a limited zero sequence (LZS) condition based on a number of weights the zero-skipping circuit is configured to process in a single cycle.

In some examples of the computing system described above, the LZS condition comprises a bounded length zeroes (BZS) condition that imposes a maximum length on zero sequences. In some examples of the computing system described above, the LZS condition comprises a maximum number of rows over which zero sequences extend. In some examples of the computing system described above, the maximum number of rows is two.

In some examples of the computing system described above, the LZS condition is based on a maximal number and a location of zero weights in a sequence of filter weights the zero-skipping circuit is configured to process and skip in a single cycle. In some examples of the computing system described above, the one or more convolution layers comprises at least 33% zero weights. In some examples of the computing system described above, the one or more FPCs comprise at least 20% of channels in the one or more convolution layers. In some examples of the computing system described above, the portion of the one or more MCs comprise at least 95% of the one or more MCs.

In some examples of the computing system described above, the LZS condition is based at least in part on a scanning order of the computing system. In some examples of the computing system described above, the LZS condition applies to sequences of consecutive zero weights over more than one channel according to the scanning order of the computing system. In some examples of the computing system described above, the ANN further comprises one or more fully connected layers that satisfy the LZS condition.

A method, apparatus, and non-transitory computer readable medium storing code for structured pruning of zero weights of an ANN are described. The method, apparatus, and non-transitory computer readable medium may provide for identifying a target ratio of zero weights for a layer of the ANN, identifying an LZS condition for the layer, wherein the LZS condition comprises a limitation on a location or sequence length of zeroes in the layer, pruning the layer based at least in part on the target ratio of zero weights by setting one or more weights of the layer to zero, determining whether each sequence of zero weights in the layer violates the LZS condition after the pruning, and resetting at least one weight within each sequence of zero weights that violates the LZS condition to a non-zero value.

Some examples of the method, apparatus, and non-transitory computer readable medium described above may further include generating a zero mask based at least in part on the pruning and the resetting. Some examples of the method, apparatus, and non-transitory computer readable medium described above may further include continuing to train the ANN based on the zero and non-zero locations in the zero mask. Some examples of the method, apparatus, and non-transitory computer readable medium described above may further include generating a linked list of MCs in the filter, wherein each MC in the linked list comprises at least one non-zero weight, and wherein each entry in the linked list comprises an index of a next MC in the linked list.

A computing system for accelerating inference processing of a structurally pruned ANN that applies zero-skipping of zero weights of the pruned ANN is described. The computing system may include one or more memory units configured to store weights of an ANN and an input tensor, a plurality of accelerator sub-systems, a multiplexing buffer configured to store weights of the ANN, a look-ahead buffer configured to store additional weights of the ANN, a zero-skipping circuit configured to identify a next non-zero weight of the ANN, and a plurality of multiply-accumulate (MAC) units configured to simultaneously process the next non-zero weight identified by the zero-skipping circuit together with a plurality of corresponding values from the input tensor.

In some examples of the computing system described above, the ANN comprises at least one convolution layer, the at least one convolution layer comprises a plurality of filters, each filter comprises a plurality of channels, each channel comprises a plurality of rows, and each row comprises a plurality of weights, and wherein the look-ahead buffer is configured to store a fixed number of rows of weights. In some examples of the computing system, the zero-skipping circuit has an LHP condition based on a limited number and arrangement of weights the zero-skipping circuit is configured to process in a single cycle. In some examples of the computing system, the LHP condition is farther limited to a fixed number of rows of weight.

The computing system described above may provide a multiplexing buffer for storing a first row of weights, wherein the first row of weights corresponds to a MC from a filter of a convolution layer of the ANN, wherein the MC comprises at least one non-zero weight, storing one or more second rows of weights from the MC in a look-ahead buffer, processing each non-zero weight of the first row, wherein the processing comprises multiplying each of the non-zero weights by input values using a one or more MAC units, determining that the one or more second rows of weights comprises at least one non-zero weight based on a look-ahead limit, and copying a row of the second rows of weights from the look-ahead buffer into the multiplexing buffer based at least in part on the determination.

Some examples of the computing system described above may further include a control unit configured to identify and skip FPCs of the ANN. In some examples of the computing system described above skipping the FPCs is done by sequentially reading each entry in the linked list if MCs and processing it.

In some examples of the pruning method, apparatus, and non-transitory computer readable medium described above, the LZS condition used for pruning comprises an LHP condition based on the number and arrangement of weights the zero-skipping circuit of the accelerated inference computing system described above is configured to process in a single cycle.

DETAILED DESCRIPTION

Figure 1:
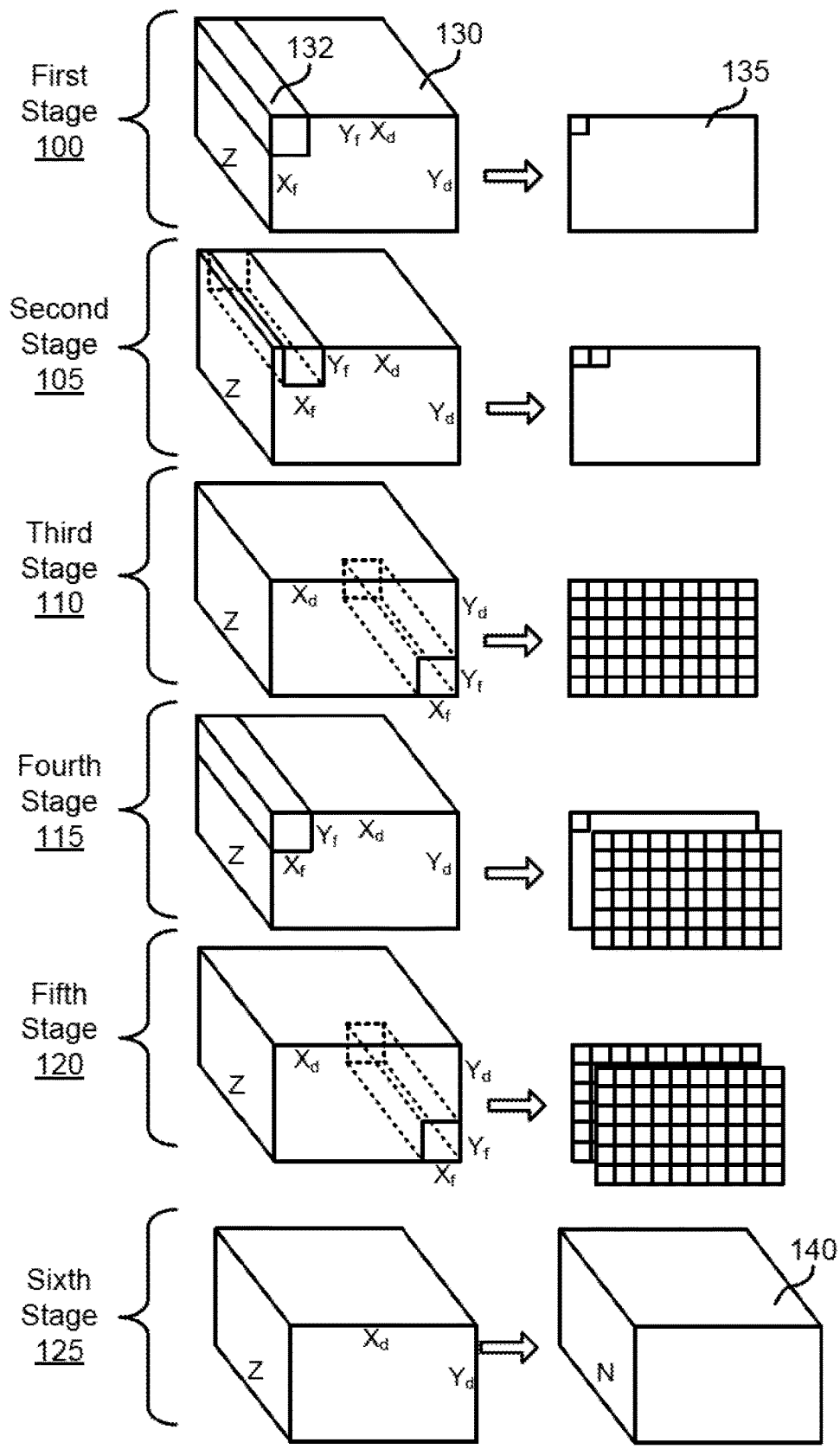
FIG. 1 shows an example of stages for processing an artificial neural network (ANN) in accordance with aspects of the present disclosure.

The present disclosure relates to accelerating the processing of an artificial neural network (ANN). Embodiments of the disclosure describe a hierarchically sparse convolution neural network (CNN) model, an algorithm for producing such a model, and a dedicated hardware accelerator planned to efficiently process it. The disclosure includes two complementary aspects related to the training and accelerated deployment (also known as "inference" computation) of ANNs. First, a pruning method is described that maintains the shape and size of the original trained ANN, but produces a new set of weights with a high rate of zeros distributed in a hierarchically structured manner. Second, convolution accelerator (CA) hardware is described for speeding up the processing of convolutions in an ANN.

The zero-skipping control mechanism of the CA may enable efficient exploitation of the sparse hierarchical structure of the structured ANN, which may avoid investing time in multiplications and additions that involves zero parameters. As a result, the CA may significantly speed up the overall ANN computation while simultaneously reducing bandwidth and power. While skipping zeros that are arbitrarily spread in the ANN filters without any structure may require complex and power-intensive circuit, the zero-skipping control described in this disclosure may be very small and power-efficient given ANN pruned with sparse hierarchical structure and may enable nearly perfect zero-skipping. This may be achieved by the tight coupling of the look-ahead limitations of the zero-skipping control with the constraints imposed on the pruned filter structure (which may be achieved using a combination of pruning and unpruning operations). In some examples, the pruning method may construct filters where a requested fraction of the channels is fully pruned, while other channels are partially pruned at another requested rate. An efficient representation of such filters allows significant reduction in bandwidth consumed by the CA for fetching filters from DRAM.

Thus, the hierarchical structure created by pruning the ANN is used by the corresponding zero-skipping hardware control to eliminate most of the computations, the time involved with processing zero parameters, and some of the bandwidth consumed for computing convolution layers. At a given time step, the CA may process one (or several) weights with its multiply-accumulate (MAC) unit (or units). At the same time the zero-skipping control uses a look-ahead buffer (or buffers) for choosing the next non-zero weight (or weights) to be processed on the next time step. However, this buffer and the related control logic have small look-ahead scope, since a large buffer and related logic consumes significant chip area and power. These limitations of the zero-skipping control may cause the AC to occasionally spend time on zero weights that could not have been predicated. To address this problem, a pruning algorithm may take the look-ahead limitations of the CA in consideration, and attempt to structure the location of zeros such that the zero-skipping mechanism will not fail despite its small size.

Embodiments of the present disclosure relate to improving the efficiency of a CNN. CNNs are a category of ANN that is often used for processing multi-dimensional signals such as images, sound (e.g. spectral features over time), video, etc. CNNs often include a set of layers connected as a directed mathematical graph. A central type of layer is the convolution layer, where an input 3D tensor is convolved using a series of 3D filters to collectively produce an output 3D tensor, which is later processed by successively connected layers in the ANN.

The convolution operation requires many MAC operations. Each multiplication operation involves a filter parameter, sometimes referred to as 'weight', and an input data value. When the filter parameter is zero the multiplication result is also zero. In such case, both parts of the MAC, the multiplication as well as the successive addition may be skipped without impacting the final result of the convolution. This is called 'zero-skipping'.

The term 'pruning' refers to the explicit act of increasing the number of zeros in the filter parameters of the convolution. Arbitrary naïve pruning of a trained ANN may significantly harm accuracy, depending on the number and the locations of zero weights. However, careful selection of weights to be pruned, fine-tuning and other techniques may be used to reduce the accuracy degradation.

'Structured pruning' may refer to introducing structural limitations on the appearance of zeros in the filters. For example, in 'vector-wise' structured pruning full 1D vectors in some 2D channels of the convolution filters are explicitly set to zero. 'Shape-wise' structured pruning may refer to when a specific fixed subset of locations is set to zero in all 3D filters of a give convolution layer.

According to the present disclosure, CA hardware implementing the convolution operation may exploit the presence of a zero weight or data-input, and therefore skip the irrelevant MAC operations. Skipping may be implemented while computing the convolution in a regular manner, by avoiding the activation of the MAC circuit whenever a zero is observed. This approach can save some of the power invested in the MAC computation. However, zero-skipping while maintaining a conventional processing order may result in wasting the energy for fetching the zero weight parameter (e.g., from DRAM) and the time for the zero-related MAC unit. Therefore, an alternative mode of operation of the Convolution Engine is to process the convolution in an irregular manner, and avoid wasting the time and potentially also the fetching energy in the zero-related operation.

In some cases, this may depend on a complex control mechanism that decides in advance on the order of fetching and processing input values and filter weight. For example, a neural accelerator with a zero-skipping control mechanism may attempt to skip all or most zeros in the filters without wasting the time. However, such a control unit may be complicated and may require a large circuit. Since an ANN accelerator typically includes many MACs operating in parallel, independent control units for individual or groups of MACs may be required. Duplicating of zero-skipping control units increases the chip area significantly. In some cases, complex circuits may consume more power than the power savings achieved by the skipped MAC operations.

Furthermore, irregularly located zeroes make it difficult to reduce the bandwidth required for fetching the filter weights.

Therefore, embodiments of the present disclosure describe Hierarchical Structured Pruning (HSP) for convolution filters. Embodiments further include a method for pruning a given ANN according to the hierarchical structure, and CA hardware that includes a small and efficient zero-skipping mechanism configured to take advantage of the pruned structure of the convolution filters.

FIG. 1 shows an example of stages for processing an ANN in accordance with aspects of the present disclosure. The example shown includes first stage 100, second stage 105, third stage 110, fourth stage 115, fifth stage 120, and sixth stage 125. Each stage may include input data 130, a filter 132, and an output channel 135 or output tensor 140. The present disclosure describes systems and methods for pruning the filter 132 and skipping zeroes in the filter 132 so that each of the stages described proceed more efficiently (i.e., with fewer computational steps).

Aspects of the present disclosure may relate to a CNN which includes one or more convolution layers. The main "inference" computation of a convolution layer is to perform mathematical discrete convolution between the input, a 3D input data tensor D whose dimensions are $X_d \times Y_d \times Z$ and a series of N pre-calculated 3D filters. Each 3D filter $F_n$ has the same dimensions $X_f \times Y_f \times Z$. Both data and filters share the same size, Z, of the third dimension. $X_f$ and $Y_f$ are typically smaller (and never larger) than $X_d$ and $Y_d$. The result of the convolution operation (indicated below by $\otimes$) between the data tensor D and each filter $F_n$ is a 2D output channel $R^n$, with weights indexed by w and h:

$$D \otimes F_n = R^n = [r_{w,h}^n] \quad (1)$$

Collectively, all N 2D output channels form a 3D tensor which is the output of the convolution operation. In some CNNs the convolution layers also include adding a bias value to each channel and performing a non-linear operation over it. Using the filter $F_n$, each scalar value $r_{w,h}^n$ is calculated by positioning $F_n$ over one location in the input tensor D, performing multiplication between pairs of corresponding data values and filter weights, and accumulate all the multiplication results:

$$r_{w,h}^n = \sum_{x=1}^{X_f} \sum_{y=1}^{Y_f} \sum_{z=1}^{Z} D[w+x-\theta_w-1, h+y-\theta_h-1, z] \times F_n[x,y,z]. \quad (2)$$

Here $\theta_w$ and $\theta_h$ are 'padding' parameters controlling the first location of the filter over the data tensor. In some cases, values of D with non-positive indices are considered zero. For example, assuming $\theta_h = \theta_w = 0$, the first output value of the convolution operation is computed as follows:

$$\text{result} = r_{1,1}^n = \sum_{x=1}^{X_f} \sum_{y=1}^{Y_f} \sum_{z=1}^{Z} D[x,y,z] \times F_n[x,y,z]. \quad (3)$$

In a first stage 100 of the convolution, a 3D tensor of input data 130 and a second 3D tensor for the filter 132 are shown on the left, and the corresponding first output scalar in the first 2D output channel 135 is shown on the right. After the first result is calculated the filter moves to another position relative to the input data 130 and another value is calculated, as illustrated in the second stage 105. In the example shown, as the filter 132 moves one step into position for the second stage 105, most of the processed elements of the input tensor remain the same as those processed during the first stage 100 (in general, the results will different from 100 to 105, only the input partially overlaps due to the overlapping positions of the filter 132 during the first stage 100 of evaluation and the second stage 105). Thus, in the case illustrated in FIG. 1 (i.e., with $X_f = Y_f = 3$), 2 out of every 3 elements computed are the same for each stage of computation. This operation is repeated until all positions in the input data 130 are covered. The first 2D output channel 135 is then fully computed as shown in the third stage 110.

Once the first output channel 135 is completed the first filter is replaced by the second filter, the scanning and multiply-accumulate (MAC) operations are repeated as shown in the fourth stage 115, and another output channel 135 is computed as shown in the fifth stage 120. After all N filters performed the convolution with the input tensor, the output tensor 140 is ready as shown in the sixth stage 125. The width and height of the of the output tensor 140 are typically similar to that of the input data 130 tensor (depending on the selection of the padding parameters and the depth of the output tensor 140 is equal to the number of filters.

Figure 2:
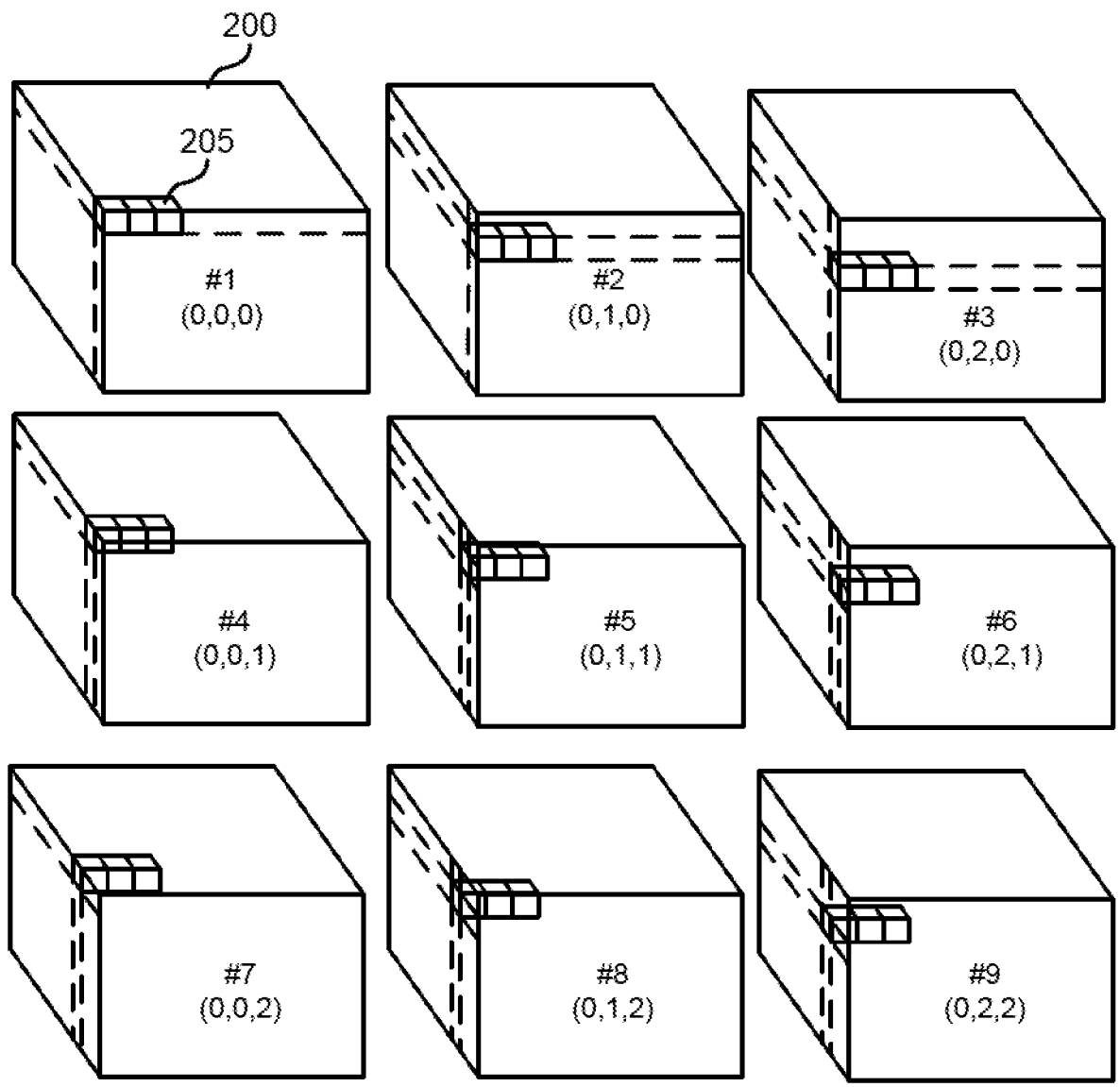
FIG. 2 shows an example of a convolution operation in accordance with aspects of the present disclosure.

FIG. 2 shows an example of a convolution operation in accordance with aspects of the present disclosure. The example shown includes input data 200 and a row 205 of a filter. As shown in FIG. 1, the filter is moved across the input data 200 to compute the result of a convolution layer. Nine different rows 205 of the filter are shown, corresponding to three channels of a filter computed during nine cycles of a process for computing the convolution layer. The movement of the rows 205 illustrates a scanning order for computing a convolution of a filter at a given position with respect to the input data 200. However, this is only an example, and a different scanning order may be used to compute a convolution layer of an ANN.

A convolution operation is a sum of multiplications of filter weight and input value pairs, and the order of processing pairs is arbitrary. One option for scanning order is presented herein by way of example, but other optional scanning orders are also applicable. For the purposes of the present example, the first row 205, at position (0,0,0), is computed along with the corresponding input data elements, after which a subsequent row (i.e., at position #2) is scanned and computed. Zero-skipping logic may be applied for each of the scanned rows. Similar scanning order and zero-skipping logic may be valid for all positions and all filters (although exact skipped locations may depend on the location of zeros in each specific filter).

Given an arbitrary location of the 3D filter over the input data tensor, a CA may first scan over the X-axis of the 2D filter channel and the input data channel (i.e., to process each row 205), then on the Y-axis (moving to the next row 205), and finally on the Z-axis (moving from channel to channel). The length of each line equals the width of the filter ($X_f$). As illustrated herein, the filter size is 3×3×Z, but any X and Y sizes may be valid.

Figure 3:
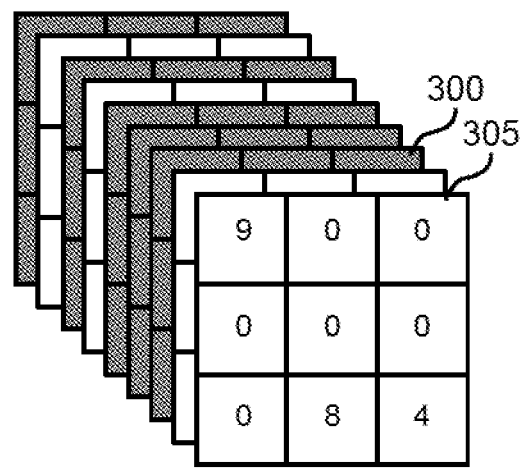
FIG. 3 shows an example of a filter of a convolution neural network (CNN) in accordance with aspects of the present disclosure.
Figure 3:
Figure 3:

FIG. 3 shows an example of a filter of a convolution neural network (CNN) in accordance with aspects of the present disclosure. The example filter shown includes fully pruned channels (FPCs) 300 and mixed channel (MCs) 305. Each FPC 300 includes only zero weights, and the MCs 305 include at least one non-zero weight (and, in some cases, only non-zero weights). According to the present disclosure, FPCs 300 may be skipped during processing of the ANN, and MCs 305 may be pruned so that zeroes within the MCs 305 satisfy some structural limitation and therefore may be efficiently skipped.

A CNN includes several convolution layers that often consume most of the computations, time and power during processing. Each convolution layer applies a discrete convolution of the input 3D data with several 3D filters that were calculated during the training process. The 3D filters may contain zero values. In some cases, methods may be used to promote the rate of zeros in the trained ANN as described herein. In some ANNs, the rate of zeros in most or all convolution filters can be as high as 80% (0.8 of all weights are zero) or more without significantly degrading the accuracy of the network. Zeros may be distributed arbitrarily in the filter. However, setting constraints on the location of zeros enables simpler implementation of optimized convolution, and improves the degree of optimization.

The constraints applied to the zero weights may be based on a two-level hierarchy. First, some 2D filters (or channels) of the 3D filter include only zeros. These are the FPCs 300. Second, other 2D channels include zeros and non-zeros. These channels may be the MCs 305. Structural constraints may limit the existence of sequences of zeros in terms of the length of sequences, their location, or a combination of both. This type of structural limitation for MCs 305 may be referred to as a limited zero sequence (LZS) constraint.

Thus, FPCs 300 include only zeros, while MCs 305 and include both zero and non-zeros. The MCs 305 shown are also constrained such that there are at most 6 successive zeros when scanning the filter top-left to bottom-right. So, in this case the length of zero sequences is limited, but not their location. The bound on the length, six in the example shown, may be a meta-parameter of the ANN filter structure.

Figure 4:
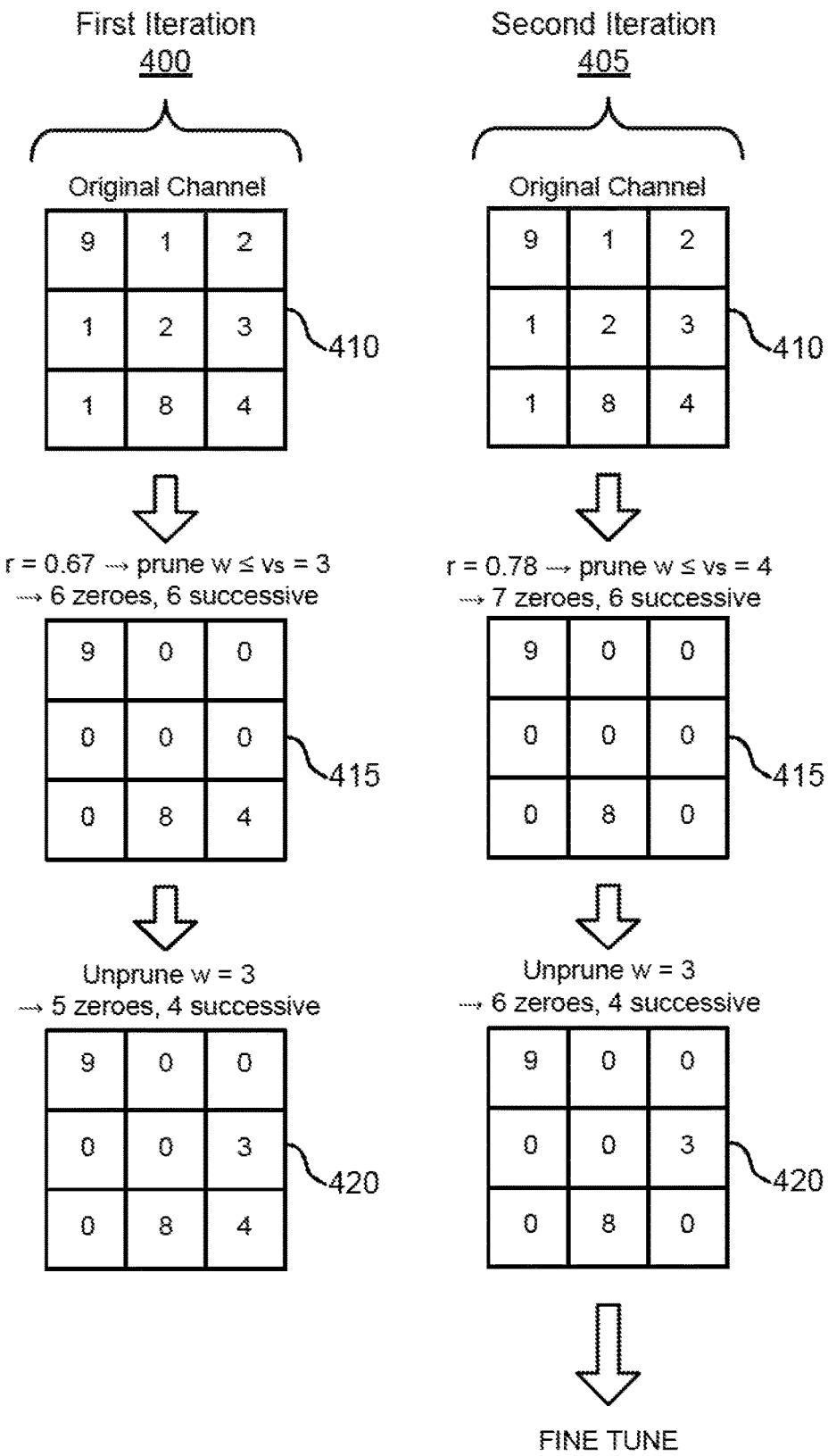
FIG. 4 shows an example of a process for pruning an ANN in accordance with aspects of the present disclosure.

FIG. 4 shows an example of a process for pruning an ANN in accordance with aspects of the present disclosure. The example shown includes first iteration 400 and second iteration 405. Each iteration may include unpruned channel 410, pruned channel 415, and structurally pruned channel 420. The first iteration 400 shows and example of pruning given a first pruning rate, after which the rate is updated and the second iteration 405 is performed. The result is a channel with the desired rate of zeroes structured in a manner that enables efficient zero-skipping when the channel is processed (i.e., as shown in FIG. 1).

Pruning is a method of increasing the number of zeros in the convolution filters of an ANN model. A pruning algorithm takes as an input a trained ANN and produces as output another ANN with the same set of layers and filter sizes, but with different values of weights, such that the fraction of zero weights among all weights reach a target rate. As the number of non-zero parameters in the pruned ANN is more restricted with respect to the original trained ANN, the performance, in terms of accuracy of the pruned ANN compared to the original trained ANN, is typically degraded. Pruning algorithms attempt to minimize accuracy degradation while at the same time maximize the pruning rate.

Some pruning algorithms focuses only on the mean rate of zeros and ignore their locations. However, structured pruning algorithms also attempt to impose some structural constraints related to zeros distribution and location in the pruned filters. For example, an HSP algorithm combines both rough pruning of FPCs and fine-grained pruning of MCs. The HSP algorithm that takes as an input a trained ANN model and two rate parameters $R_{total}$ and $R_{FPC}$.

The HSP algorithm produces an ANN where 3D convolution filters are pruned such that for every 3D filter the total rate of zeros among all weights is $R_{total}$, the rate of 2D FPCs among all channels is $R_{FPC}$, the remaining MCs are pruned with a calculated rate $R_{MC}$ (based on $R_{total}$ and $R_{FPC}$, such that the overall rate of zeros in the FPCs and MCs collectively is $R_{total}$), and MCs are structurally pruned according to the limited hardware prediction (LHP) constraint (or to some other LZS constraint). In other words, structured pruning is done with consideration of how the zeros will later be skipped by a zero-skipping method, and incorporates the limitations of such methods. Further details of various zero-skipping methods and related potential limitations of skipping are described below with reference to FIG. 16.

In some cases, the HSP algorithm includes an exception for filters of size 1×1×Z, where each '2D filter' is only one weight. For such filters, only FPCs (of one weight each) are considered and the algorithm applies a rate of $R_{total}$ for all weights. Following are three frames describing together the HSP algorithm. The first frame presents the high-level flow of the algorithm. It includes functional calls to 'FPCs pruning' and 'MC pruning' procedures that are described in the two successive frames.

non-pruned weights are gradually readjusted to compensate, at least to some extent, for the inaccuracies in the ANN operation that occur after many weights were set to zero.

Frame 2 describes the procedure that gets a 3D filter and a target pruning rate from the main algorithm (first frame), selects a subset of 2D channels according to the rate and the weights of each channel, and pruned them. This example algorithm chooses to fully prune channels whose maximal weight magnitudes are the smallest, but other options for selecting FPCs whose impact on the final inference results is relatively small may also be applicable.

---
Frame 1. High Level Flow of the HSP Algorithm
---

Neural Network Hierarchical Structured Pruning algorithm
   // Given parameters:
   // $R_{total}$ is the total target pruning rate $R_{total}$
   // $R_{FPC}$ is the target rate of Fully Pruned 2D Channels (FPC)
   For every convolution layer C in the NN
      For every 3D filter F of size $X_F \times Y_F \times Z$ in convolution layer C
         if $X_F = 1$ AND $Y_F = 1$
            FPCs pruning: Fully prune 2D channels of 3D filter F at rate $R_{total}$
         else
            FPCs pruning: Fully prune 2D channels of 3D filter F at rate $R_{FPC}$
            $R_{MC} = (R_{total} - R_{FPC})/R_{total}$  // Pruning rate for remaining Mixed Channels
            MCs pruning: partially prune 2D channels of 3D filter F at rate $R_{MC}$ with LHP
$\overline{NN}$ is the pruned neural network, a collection of all pruned filters and channels.
Fine-tune the $\overline{NN}$ by training it, starting with the given weights. in the same manner that the original NN was trained. However, after training with each data batch, enforce all weight locations that contained zero in the original $\overline{NN}$ back to zero.
// After fine-tuning, non-zero weights from $\overline{NN}$ may have changed, but the zero weights.
// the same pruning rate and structure from $\overline{NN}$ remains.
Output the fine-tuned, pruned $\overline{NN}$

---

The algorithm is divided to two main sections. The first section goes over the filters and applies pruning of FPC and MC. The output $\overline{NN}$ contains non-zero and zero weights. It serves as a starting point model to the second section, fine-tuning of $\overline{NN}$, that may consume most of the computation time of the algorithm. In addition, the locations of zeros in the original pruned $\overline{NN}$ (just after the first section, before fine-tuning) are separately kept as a collection of 3D binary masks $\overline{NN}_{bin}$. It contains 3D tensors corresponding in size and shape to the convolution filters of $\overline{NN}$ but holding only 0-s and 1-s (in all locations with non-zero weights of $\overline{NN}$ filters).

Fine-tuning is typically a series of training step, each step using one batch of input data items (e.g. 100 images). Backpropagation after each batch processing slightly changes all weights in $\overline{NN}$, zeros and non-zeros, so the number of zeros may significantly decrease. However the masks in $\overline{NN}_{bin}$ do not change during the find-tuning process. It is applied after the training step such that all locations in the fine-tuned $\overline{NN}$ whose corresponding locations in $\overline{NN}_{bin}$ are zeros, are also reset to zero. After the reset step the pruning rate and the structure of the fine-tuned $\overline{NN}$ are again identical to the original $\overline{NN}$. In this manner the ---
Frame 2. FPC Pruning Algorithm
---

FPCs pruning procedure: Fully prune 2D channels of 3D filter F at pruning rate R
   For every 2D channel $W_j$ in F.
      $m_j \leftarrow \max|W_j|$  // maximal absolute weight among
      $X_p \times Y_p$ weights in $W_j$
   Let M be the vector of all Z $m_j$-s. sorted in ascending order
   $s \leftarrow \text{round}(R \times Z)$
   For every 2D channel $W_j$ in F.
      If $\max|W_j| \leq m_S$ fully pruned $W_j$ in F. by setting all weight
      to 0

---

Frame 3 describes the procedure that gets a 3D filter, and applies fine-grained pruning of the MCs at a minimal given rate $R_{MC}$, while satisfying the structural constraint LHP on the location and length of zero sequences, as derived from limitations of the zero-skipping hardware system.

---
Frame 3. MC Pruning Algorithm
---

MC pruning procedure: partially prune 2D channels of 3D filter F at rate $R_{MC}$ with LHP
   $r \leftarrow R_{MC}$
   iter $\leftarrow 0$
   Repeat
      $s \leftarrow \text{round}(r \times X_F \times Y_F)$  // number of requested zeros in each 2D MC W
      For every mixed 2D channel W in F (channel that was not previously selected as FPC)
         V $\leftarrow$ Vector of all absolute weights $|w_i|$, $w_i \in W$. flattened, sorted in ascending order Frame 3. MC Pruning Algorithm $\overline{W}$ ← prune W, set to zero all weights w ∈ W such that w ≤ $v_s$ //the s-th value in V
p ← first position in $\overline{W}$, in the order it is processed by the CA
Repeat // find and fix cases where zero-skipping in the CA falls
    q ← the position in $\overline{W}$ that is processed by the CA after the current position p
        // based on its look-ahead zero-skipping mechanism, applying LHP.
        // notice that: q = p + 1 or all $\overline{w}_{p+1}, \ldots, \overline{w}_{q-1}$ in $\overline{W}$ are 0
    if $\overline{w}_q$ = 0 // zero will be processed by the CA - try to prevent this
        find k = $\text{argmax}_{p+1 \le t \le q-1} |w_t|$. the location of the pruned value from W
            in the look-ahead scope p + 1, ..., q − 1. with maximal magnitude.
        if $w_k \ne 0$,
            unprune $w_k$ in $\overline{W}$: $\overline{w}_k \leftarrow w_k$ //set to original non-zero and get less zeros
            q ← k //next processed location is now k with $w_k \ne 0$
        end
    end
    p ← q, the next position in the CA processing order
    Until p is the test position in $\overline{W}$
end // until all mixed channels are processed
$\overline{r}$ ← calculate current rate of zeros in $\overline{W}$ //typically below r, due to unpruning
r ← r + $R_{MC}$ − $\overline{r}$ //increase the pruning rate to be achieved before unpruning
iter ← iter +1
Until $\overline{r} \ge R_{MC}$ OR iter ≥ MAX_ITER //actual pruning rate achieves the target
Replace each mixed channel W in F with its corresponding final $\overline{W}$.

The example algorithm shown is based on several iterations (the outer repeat-until loop). At each iteration the algorithm goes over the mixed channels one by one (the for-end loop), prunes them with a rate r that was selected for this iteration, and then 'unprunes' some of the previously pruned weights (the inner repeat-until loop). An 'unpruning' operation replaces the zero value with the original value of the weight before it was pruned. The selective unpruning ensures that sequences of zeros do not exceed the length and locations dictated by the constraints (e.g., the LHP constraint). After the pruned structure of all channels is corrected by unpruning, the algorithm evaluates the actual rate of zeros. This may become smaller than r since unpruning decreases the number of zeros. As long as the actual zero rate $\overline{r}$ after unpruning is still below the target pruning rate $R_{MC}$, the target pruning rate r is slightly increased and the pruning and unpruning cycle is repeated.

To choose the locations for unpruning, the algorithm scans the filter using the same logic that is implemented by the zero-skipping component of the corresponding CA hardware. If a zero weight is selected by this component during the scan, it implies that the zero-skipping logic could not predict it. To prevent wasting time on multiplying a zero during ANN deployment time on the CA, the unpruning operation adds a non-zero somewhere in the range between the previously processed weight and the next weight to be processed, that contains zeros. So, instead of processing a zero, the CA will process during deployment the added non-zero. It is better that an informative non-zero is processed instead of the zero. This adds a parameter to the ANN without adding processing time, giving it more flexibility and potential to increase accuracy.

Thus, FIG. 4 shows two iterations of pruning and unpruning on one mixed channel. While the weights in the example were chosen to be non-negative integers, in a real ANN weights may be positive and negative real values. The original trained filter 410 (left, top) includes nine non-zero weights. The target pruning rate is $R_{MC}$=0.67. Initially, before the first iteration, r is set to $R_{MC}$, r=0.67, s=6 and $v_s$=3 so six weights whose values w≤3 are pruned (1,2,1,2,3,1). The pruned channel (left, center) has a sequence of zeros that spans over three rows. Assume that the look-ahead and zero-skipping control of the CA supports only LHP constraint with $\Delta_y$=1, and the CA processing order is top-left to bottom-right. When the CA processes the 9, the look-ahead buffer contains the first and second rows. It searches for non-zero values in the buffer but finds only zeros, as it cannot see the third row. Without examining the weight value, it selects the next location for processing to be (1,3), to see if it contains non-zero.

In the example, it does hold a zero. This means that given the pruned channel, the next hardware cycle of the CA will be spent processing a zero weight. To prevent this wasted processing cycle, the algorithm uses the unpruning operation. The original weights in the locations of the six zero sequence are evaluated, and the original weight with largest magnitude, 3 in our case (but it may be negative in the general case), is unpruned (left, bottom). Now, with this improved structure of the channel, the zero-skipping control can see the 3 in the look-ahead buffer when it is processing the 9. So, after processing the 9, the CA control will skip four zeros and process the 3 immediately on the next cycle, without wasting time on processing any zeros. Next, 8 will be processed, and then 4. We got perfect zero-skipping, but the pruning rate is only 0.56 (5 out of 9), less than the requested 0.67.

To fix this issue, the algorithm updates r and starts a second iteration 405 with pruning and unpruning steps. The new r is r+$R_{MC}$−$\overline{r}$=0.67+0.67−0.56=0.78. Now at pruned channel 415, s=7, $v_s$=4 and seven weights whose values w≤4 are pruned (right, center). Similar to the first iteration 400, unpruning returns the weight 3 (still largest in the position of the chain of six zeros). Finally at structurally pruned channel 420 on the second iteration 405 (right, bottom), we get the target pruning $R_{MC}$=0.67. In addition, the channel structure is fully aligned with the predication capabilities of the small look-ahead buffer and zero-skipping control of the CA, such that zero-skipping during deployment is perfect, and no cycles are wasted on processing zeros. All mixed channels in all convolution filters may be similarly processed. Once the structure and location of zeros is decided in all filters, the ANN may be fine-tuned using the zeros mask.

Thus, the present illustration shows an example of pruning an ANNs with the HSP algorithm. The algorithm was tested and applied over several modern ANNs, using pruning rates of, for example, $R_{total}$=0.7 and $R_{FPC}$=0.35 and LHP constraint described above with parameter $\Delta_y$=1. The degradation in classification accuracy of the pruned ANNs with respect to the original ANNs was small, e.g. around 1%. In some cases, the degradation in accuracy depends on the specific ANN structure and its task. Due to the hierarchical structure and the LHP constraints of zero sequences, these pruned ANNs can be processed on the CA described herein with almost perfect zero-skipping, that is, without wasting clock cycles on nearly any zero weights. As a result, the overall time of processing the pruned ANN on the CA may be as low as 30% (or lower) of the time required for processing the original non-pruned ANN.

Figure 5:
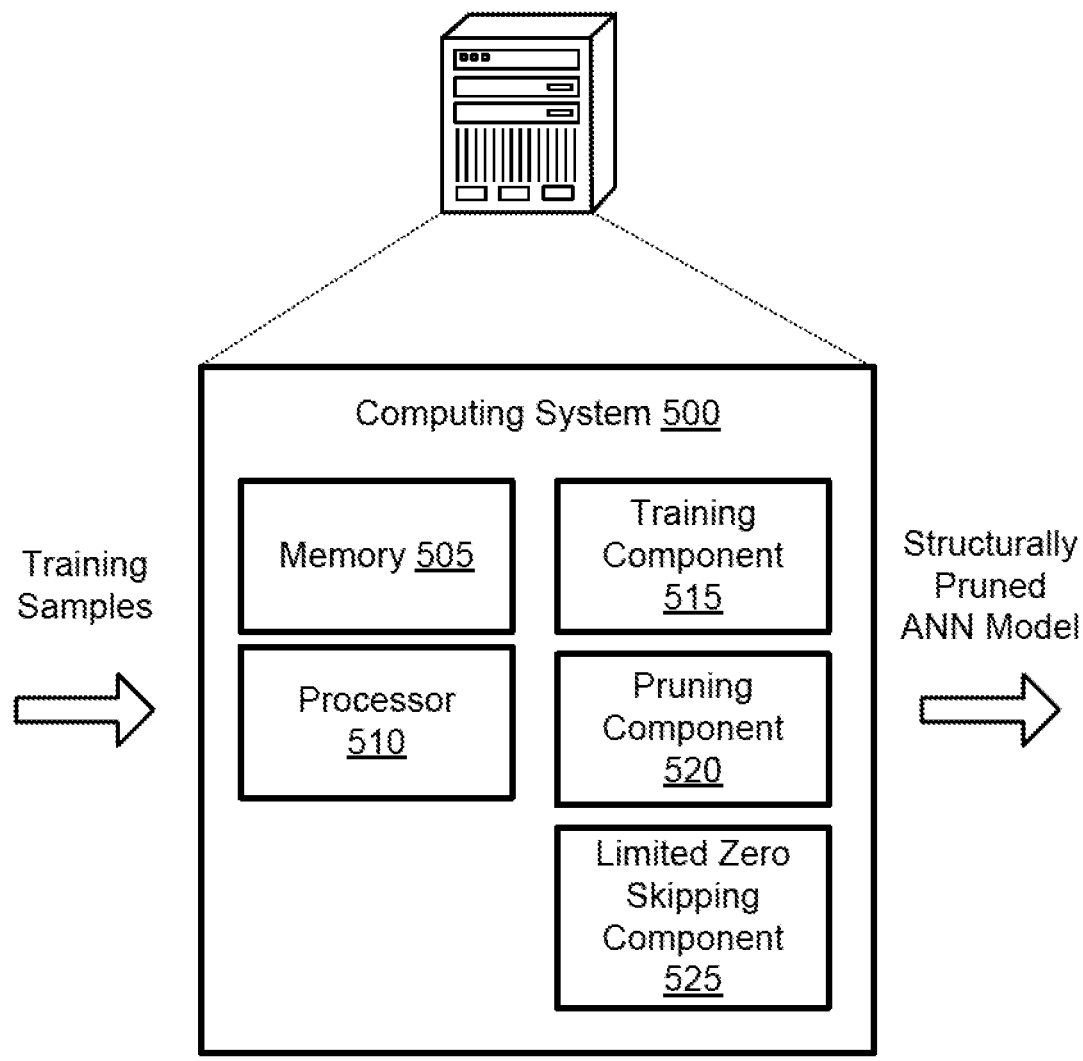
FIG. 5 shows an example of a computing system for training an ANN in accordance with aspects of the present disclosure.

FIG. 5 shows an example of a computing system 500 for training and pruning an ANN in accordance with aspects of the present disclosure (i.e., an ANN Training & Pruning System). Computing system 500 may be an example of, or include aspects of, the corresponding element or elements described with reference to FIGS. 6 and 7. Computing system 500 may include memory 505, processor 510, training component 515, pruning component 520, and Limited zero-skipping component 525. Computing system 500 may take training samples as an input and output a structurally pruned ANN model.

Memory 505 may include units configured to store weights of an ANN and an input tensor. In one example, memory 505 may include dynamic random access memory (DRAM). The memory 505 may be solid state or a hard disk drive, and may store computer-readable, computer-executable software including instructions that, when executed, cause a processor to perform various functions described herein. In some cases, the memory 505 may contain, among other things, a BIOS which may control basic hardware or software operation such as the interaction with peripheral components or devices. In some cases, a memory controller may operate memory cells as described herein. In some cases, memory controller may include a row decoder, column decoder, or both. In some cases, memory cells within a memory 505 may store information in the form of a logical state.

A processor 510 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 510 may be configured to operate a memory array using a memory controller. In other cases, a memory controller may be integrated into processor 510. The processor 510 may be configured to execute computer-readable instructions stored in a memory to perform various functions.

In some cases, processor 510 includes a plurality of accelerator sub-systems. In some cases, processor 510 may include a zero-skipping circuit configured to locate non-zero weights. Processor 510 may be an example of, or include aspects of, the corresponding element or elements described with reference to FIGS. 6 and 7.

Training component 515 may train the ANN. In some case, the training component 515 may continue to train or fine-tune an ANN based on a zero mask generated during a pruning operation.

Pruning component 520 prunes an ANN (i.e., changes weights of the ANN to zero weights). For example, pruning component 520 may identify a target ratio of zero weights for a layer of the ANN. Pruning component 520 may also prune the layer based at least in part on the target ratio of zero weights by setting one or more weights of the layer to zero. Pruning component 520 may also determine whether each sequence of zero weights in the layer violates the LZS condition after the pruning. Pruning component 520 may also reset at least one weight within each sequence of zero weights that violates the LZS condition to a non-zero value.

Pruning component 520 may also generate a zero mask based at least in part on the pruning and the resetting. Pruning component 520 may also identify a target ratio of FPCs for the layer of the ANN, wherein FPCs contain only zero weights, and wherein the pruning is further based on the target ratio of FPCs. In some examples, at least 95% of MCs within the layer satisfy the US after resetting the at least one weight.

Limited zero-skipping component 525 may include the same or similar logic to the limited zero-skipping component 630 described with reference to FIG. 6, which may be implemented by the limited zero-skipping circuit described with reference to FIG. 7. limited zero-skipping component 525 identifies an LZS condition for the layer, wherein the LZS condition comprises a limitation on a location or sequence length of zeroes in the layer. In some examples, the LZS condition comprises a bounded length zeroes (BZS) condition comprising a maximum length of zero sequences. In some examples, the LZS condition comprises an LHP condition based on sequences of zero weights within a maximal number of rows of weights in a filter that a zero-skipping circuit 630 of a computing system for processing the ANN (i.e., computing system 600) is configured to process and skip in a single cycle.

Figure 6:
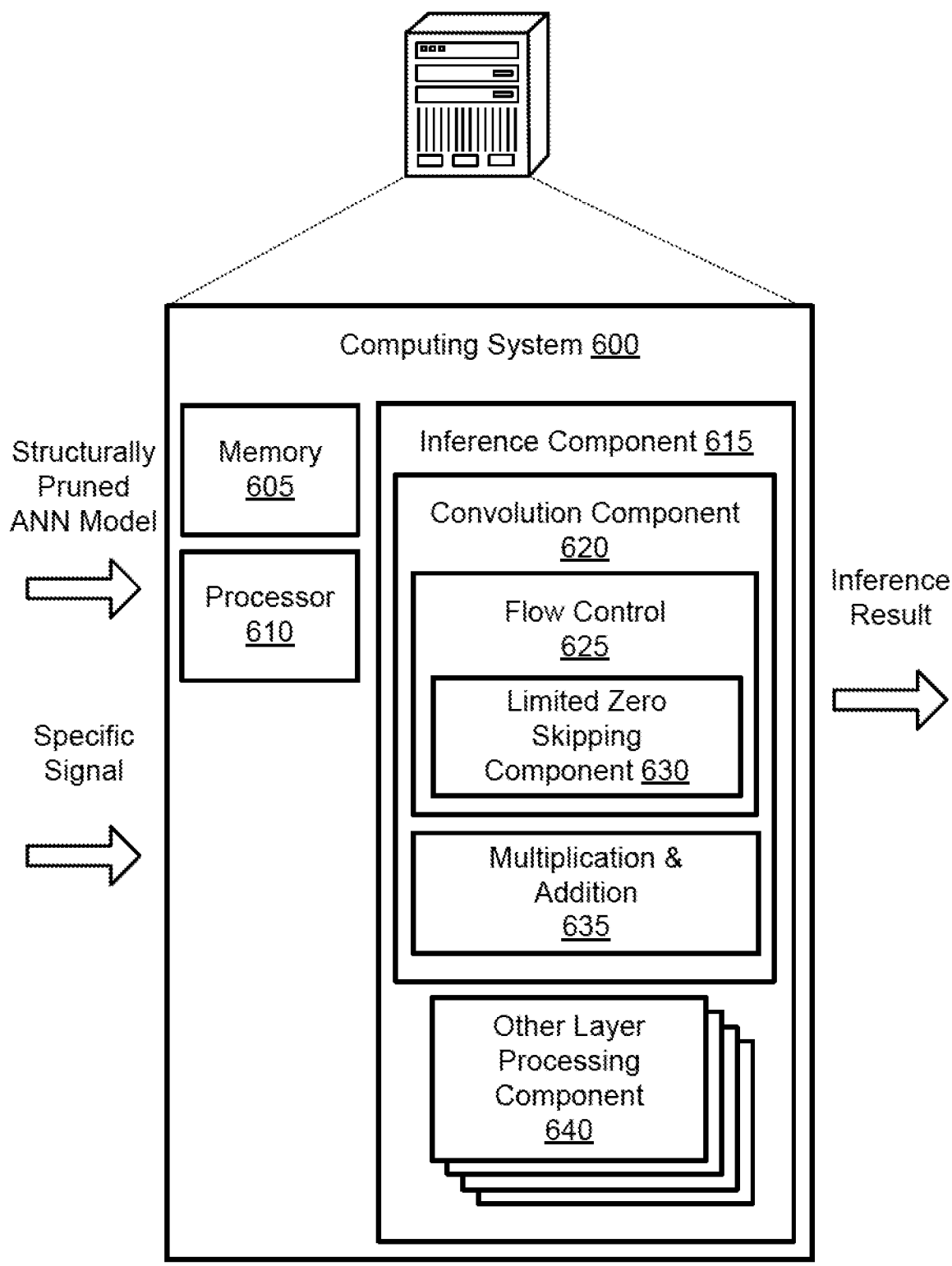
FIGS. 6 and 7 show examples of a computing system for processing an ANN in accordance with aspects of the present disclosure.

FIG. 6. shows an example of a computing system 600 for processing an ANN (i.e., ANN inference) in accordance with aspects of the present disclosure. Computing system 600 may be an example of, or include aspects of, the corresponding element or elements described with reference to FIGS. 5 and 7. Computing system 600 may take a structurally pruned ANN model (i.e., as output by computing system 500 described with reference to FIG. 5) as well as a specific input signal (i.e., an image to be processed) and output an inference result.

Computing system 600 may include memory 605, processor 610, and inference component 615. Memory 605 may be an example of, or include aspects of, the corresponding element or elements described with reference to FIGS. 5 and 7. Processor 610 may be an example of, or include aspects of, the corresponding element or elements described with reference to FIGS. 5 and 7.

Inference component 615 may include convolution component 620 and one or more other layer processing components 640. Convolution component 620 may include flow control 625, limited zero-skipping component 630, and multiplication and addition component 635.

Flow control 625 may be configured to identify and skip FPCs of the ANN. For example, Flow control 625 may generate a linked list of MCs in the filter, wherein each MC in the linked list comprises at least one non-zero weight, and wherein each entry in the linked list comprises an index of a next MC in the linked list. Flow control 625 may also sequentially read each entry in the linked list, wherein the MC is processed based on an entry in the linked list. Flow control 625 may also skip an FPC of the filter based on the FPC not having a corresponding entry in the linked list. Flow control 625 may be an example of, or include aspects of, the control units described with reference to FIGS. 9-12.

Limited zero-skipping component 630 may be configured to identify a next non-zero weight of the ANN. In some examples, the limited zero-skipping component 630 is further configured to evaluate a fixed number of lines in a look-ahead buffer and copy a line of weights to a multiplexing buffer based on the evaluating.

Limited zero-skipping component 630 may also determine that one or more second rows of weights comprises at least one non-zero weight based on a look-ahead limit, wherein the look-ahead limit is based at least in part on a LZS condition of the ANN. Limited zero-skipping component 630 may also copy a row of the second rows of weights from the look-ahead buffer into the multiplexing buffer based at least in part on the determination. In some examples, the LZS condition comprises an LHP condition based on a number and arrangement of weights the limited zero-skipping component 630 is configured to process in a single cycle. In some examples, the LZS condition comprises an LHP property limiting successive zero weights to a number of rows based on a size of the look-ahead buffer.

In some examples, a look-ahead buffer may be configured to store weights of the ANN. For example, look-ahead buffer may store one or more second rows of weights from the MC. A multiplexing buffer may also be configured to store weights of the ANN. Multiplexing buffer may store a first row of weights in a multiplexing buffer, wherein the first row of weights corresponds to a MC from a filter of a convolution layer of the ANN, wherein the MC comprises at least one non-zero weight.

Multiplication and addition component 635 may comprise an array of MAC units may be configured to simultaneously process the next non-zero weight identified by the limited zero-skipping component 630 together with a plurality of corresponding values from an input tensor. MAC units may process each non-zero weight of the first row, wherein the processing comprises multiplying each of the non-zero weights by input values using a one or more MAC units. MAC units may be an example of, or include aspects of, the MAC units described with reference to FIGS. 7 and 12.

Thus, in some cases, convolution component 620 may comprise a convolution accelerator (CA) configured to operate with efficient zero-skipping control that supports hierarchically pruned convolution filters with FPCs and MCs having an LHP constraint. Skipping FPCs using a precalculated linked list may be combined with small look-ahead line buffer and related control functions for skipping zeros in MCs. In order to accelerate ANN computations, the CA may operate multiple MAC units, flow control units, and associated memories in parallel. The CA may also be configured to utilize an efficient zero-skipping mechanism in the context of a single machine that performs convolution between input data and a single filter.

Figure 7:
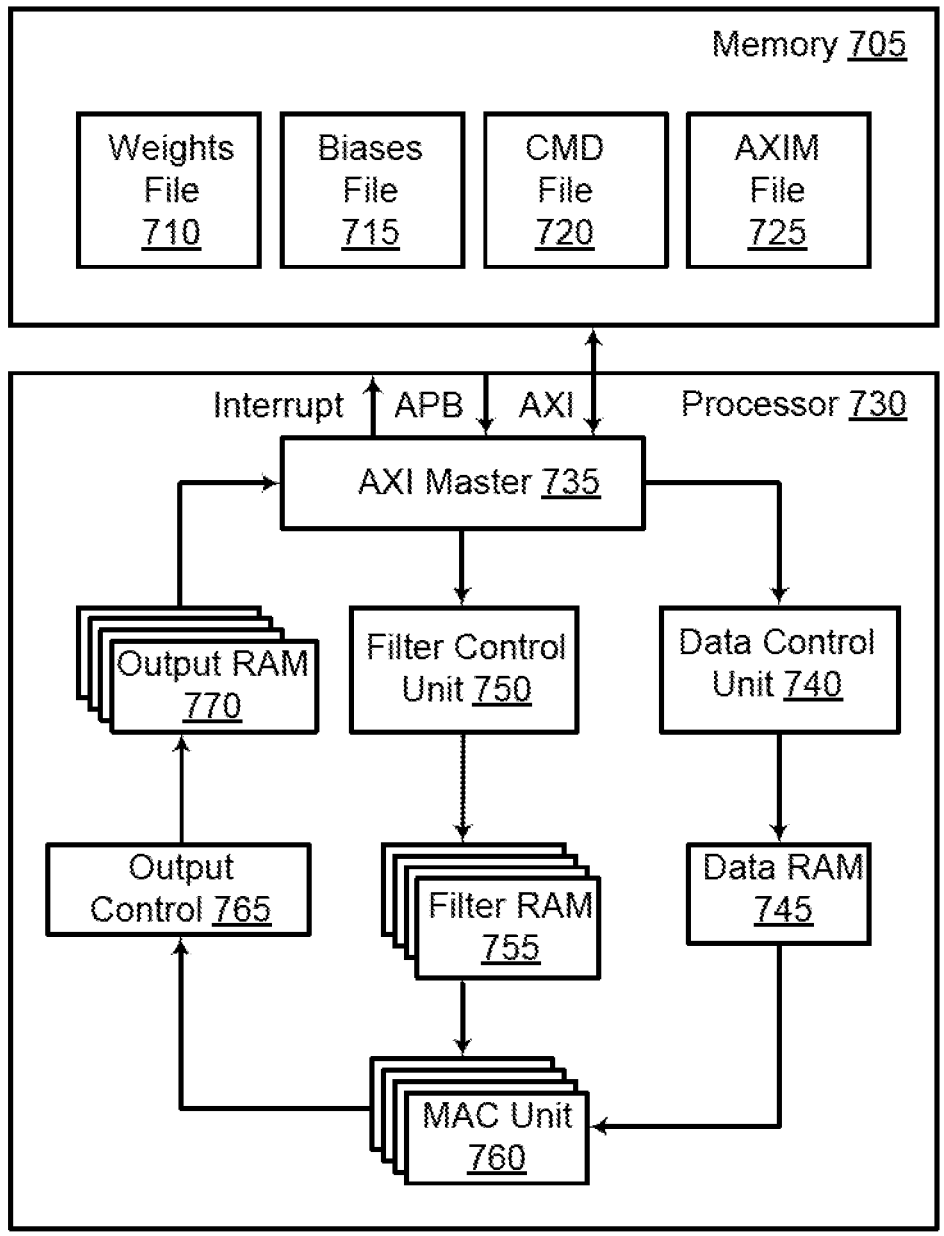

FIG. 7 shows an example of a computing system 700 for processing an ANN in accordance with aspects of the present disclosure (i.e., a Convolution Accelerator). Computing system 700 may represent a hardware implementation of the convolution component 620 described with reference to FIG. 6. Specifically, computing system 700 shows how filter weights together with values from the input data may be processed via separate paths until being combined at an array of MAC units 760. Computing system 700 includes pathways for both data and filter values to be separately selected, stored, and processed (e.g., during computation of a convolution layer of an ANN).

Computing system 700 may include memory 705 and processor 730. Memory 705 may be an example of, or include aspects of, the corresponding element or elements described with reference to FIGS. 5 and 6. Memory 705 may include weights file 710, biases file 715, CMD file 720, and AXIM file 725. Processor 730 may be an example of, or include aspects of, the corresponding element or elements described with reference to FIGS. 5 and 6. Processor 730 may include AXI master 735, data control unit 740, data RAM 745, filter control unit 750, filter RAM 755, MAC unit 760, output control 765, and output RAM 770. In some cases, processor 730 may also be referred to as a convolution accelerator (CA).

AXI master 735 may send and retrieve data from memory 705 (e.g., a DRAM). Data control unit 740 and filter control unit 750 may select data and filter values for processing. Data control unit 740 and filter control unit 750 may be components of a flow control 625.

In some examples, an AXI master reads from the memory (e.g., a DRAM) and feeds the data control with the input data and the filter control with the weights. The array of MAC blocks performs the multiplications and additions of input data values and filter weights and outputs the result, when ready, to the output control 765. The AXI master transfers the results to the memory. The data control block and the filter control block scan the corresponding data and filter 3D tensors, and choose pairs of values to be processed by the MAC units. Since data and filter may be scanned in an aligned manner, the two control blocks may have a similar design. The zero-skipping mechanism may also be implemented in these two blocks in a similar manner, as the skipping of zeros in the filter is synchronized with skipping the corresponding locations in the input data tensor.

Data RAM 745 may store data values identified by filter control unit 750. Data RAM 745 may be an example of, or include aspects of, the corresponding element or elements described with reference to FIG. 12. Filter RAM 755 may store filter values identified by filter control unit 750. Filter RAM 755 may be an example of, or include aspects of, the corresponding element or elements described with reference to FIG. 12. Weights store in the filter RAM 755 may be processed and skipped (e.g., by limited zero-skipping component 630).

MAC units 760 may combine filter and data values. MAC units 760 be an example of, or include aspects of, the corresponding element or elements described with reference to FIGS. 6 and 12. The combine values may be selected by output control 765, and stored in output RAM 770.

Figure 8:
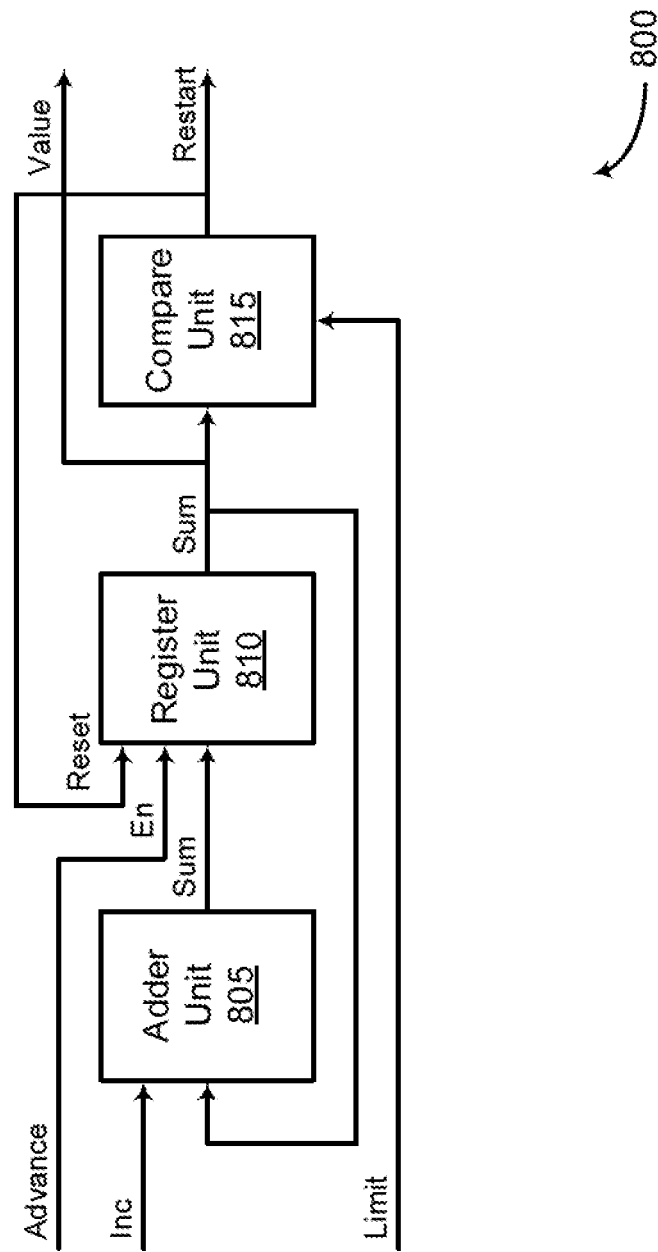
FIG. 8 shows an example of a counter block in accordance with aspects of the present disclosure.

FIG. 8 shows an example of a counter block 800 in accordance with aspects of the present disclosure, i.e., a Basic Control Unit, or BCU. Counter block 800 supports two basic functions: "MAC" (i.e., multiplication and addition) and "Maximum." The MAC function may be used for convolution and fully connected layers, whereas the Maximum (i.e., Compare) function may be used for MAX pooling layers. Counter block 800 may include adder unit 805 (i.e., for performing the MAC function), register unit 810, and compare unit 815 (for performing the Maximum function).

The counter block 800 counts from zero to a 'limit' value (which is an input to the block) with increments of 'inc' value (another input to the block). The counter works as long as an 'advance' signal is high. In an example embodiment, the counter block 800 works continuously until it gets a restart signal that indicates the result is ready and should be sent to an output stage. Based on the restart signal, the register unit 810 is reset and the process restarts.

Figure 9:
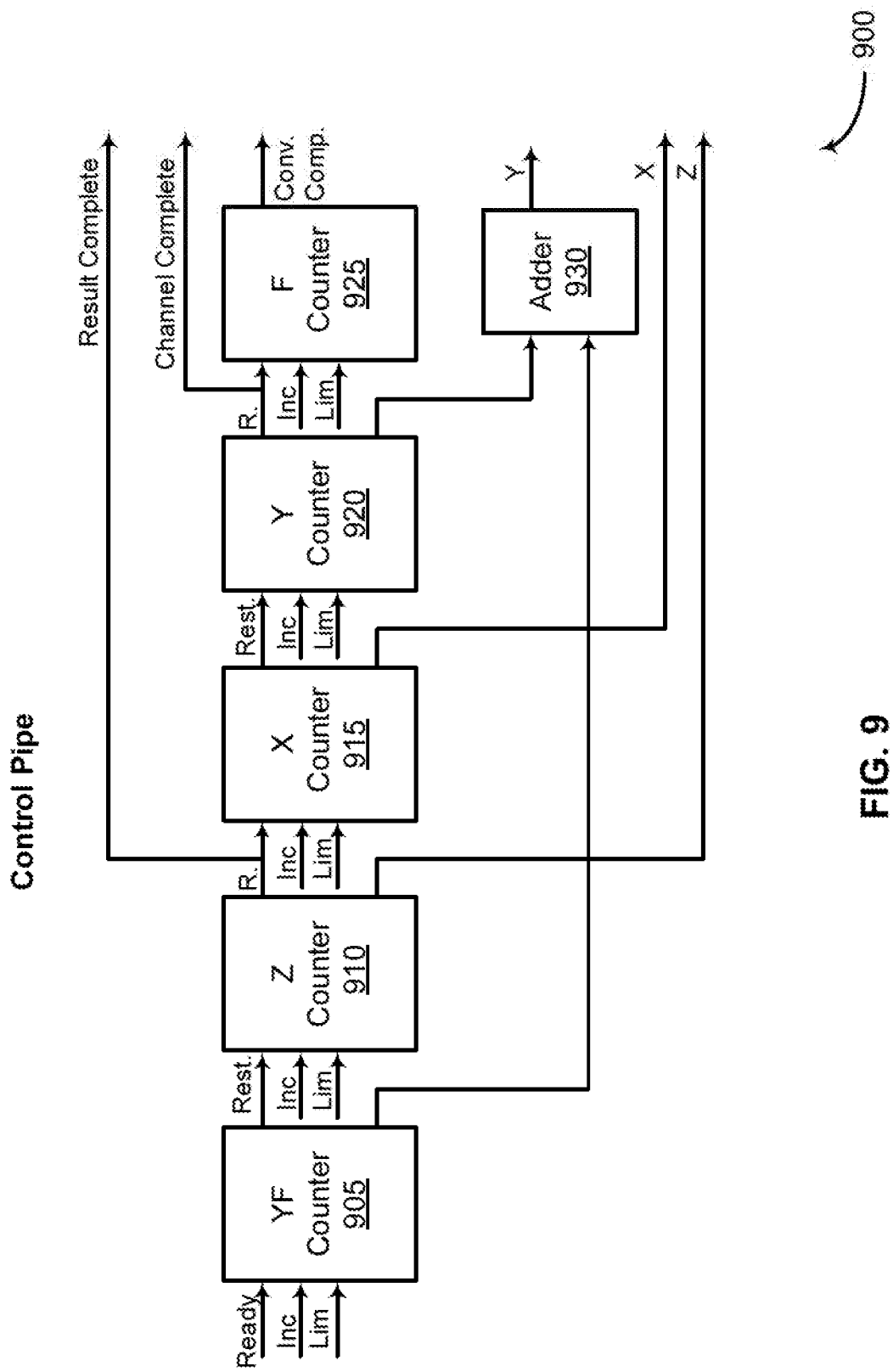
FIG. 9 shows an example of a position control block in accordance with aspects of the present disclosure.

FIG. 9 shows an example of a position control block (control unit 900) in accordance with aspects of the present disclosure (i.e., a Control Pipe). Control unit 900 may represent the core pipeline of a data control unit or a filter control unit (i.e., data control unit 740 or filter control unit 750 described with reference to FIG. 7). Control unit 900 may include multiple counter blocks, each of which may include subcomponents such as those described with reference to the counter block 800 of FIG. 8. Specifically, control unit 900 may include YF counter 905, Z counter 910, X counter 915, Y counter 920, F counter 925, and adder 930. Control unit 900 may be an example of, or include aspects of, the corresponding element or elements described with reference to FIGS. 6, and 10-12.

The control unit 900 calculates the scanning order of filters and data during convolution. It may be implemented as a cascade of counter blocks. One example of a scanning order may be: Yf—count along y-axis inside filter; Z—count along z-axis; X—count along x-axis inside the 3D input data tensor; Y—count along y-axis inside the 3D input data tensor; and F—count over all filters.

The control unit 900 is responsible for calculating the position of the left pixel of the current filter's line (i.e., in a single dimension). In some examples, scanning along the X-axis of the filter is not part of the position control block. Rather, it may be implemented by a separate X_ctrl block. That is, the X_ctrl block is responsible for selecting the current pixel from the filter's line that will be fed to the BCU. This may be the case for both data and filter input values.

In example embodiments, a 'ready' input is high as long as the receiving Line FIFO is not full. The 'result_complete' signal is generated when a single scalar 'result' is ready for output after all filter locations are processed (i.e., after the filter was located on some data position). Similarly 'channel_complete' and 'conv_complete' signals indicate completion of the calculations of full 2D output channel or the entire 3D output tensor, respectively.

Figure 10:
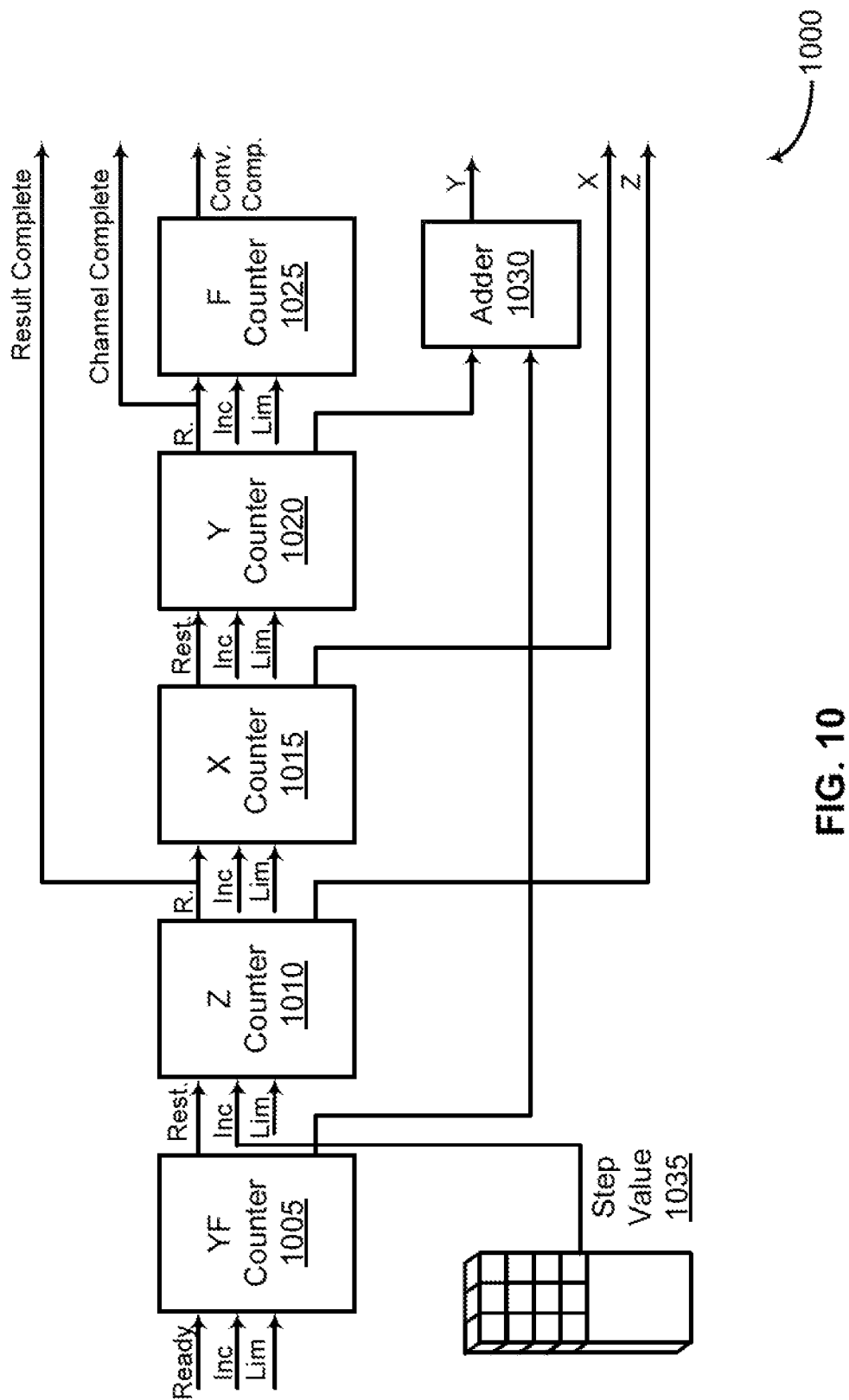
FIG. 10 shows an example of a modified position control block in accordance with aspects of the present disclosure.

FIG. 10 shows an example of a modified position control block (control unit 1000) in accordance with aspects of the present disclosure (i.e., a Control Pipe with Step Mechanism). Position control unit 1000 has been modified from the example shown in FIG. 9 in order to support skipping FPCs based on step value 1035.

For FPCs in a 3D filter, all computations related to the channel are irrelevant. The 2D filter channel and the corresponding 2D input data channel can be skipped entirely. Thus, FPCs may be omitted from the representation of a hierarchical sparse convolution filter. Thus, the MCs may be arranged as a linked list, such that each one is followed by a step value 1035 as described previously with reference to Table 1.

The step value 1035, which indicates the difference between the index of the current and next MC, is processed by the position control block. Thus, the modified position control block may be similar to the corresponding component described with reference to FIG. 7, but the Z counter 1010 can add the step value 1035 to its current content, instead of incrementing a fixed 1 step. Using a step larger than one may causes a jump in the Z-axis such that one or more FPCs are entirely skipped without wasting any cycles on processing zeroes, and without consuming bandwidth and power for fetching zero weights.

Control unit 1000 may be an example of, or include aspects of, the corresponding element or elements described with reference to FIGS. 6, 9, 11, and 12. Control unit 1000 may include YF counter 1005, Z counter 1010, X counter 1015, Y counter 1020, F counter 1025, and adder 1030, each of which may be an example of, or include aspects of, the corresponding element or elements described with reference to FIG. 9.

Figure 11:
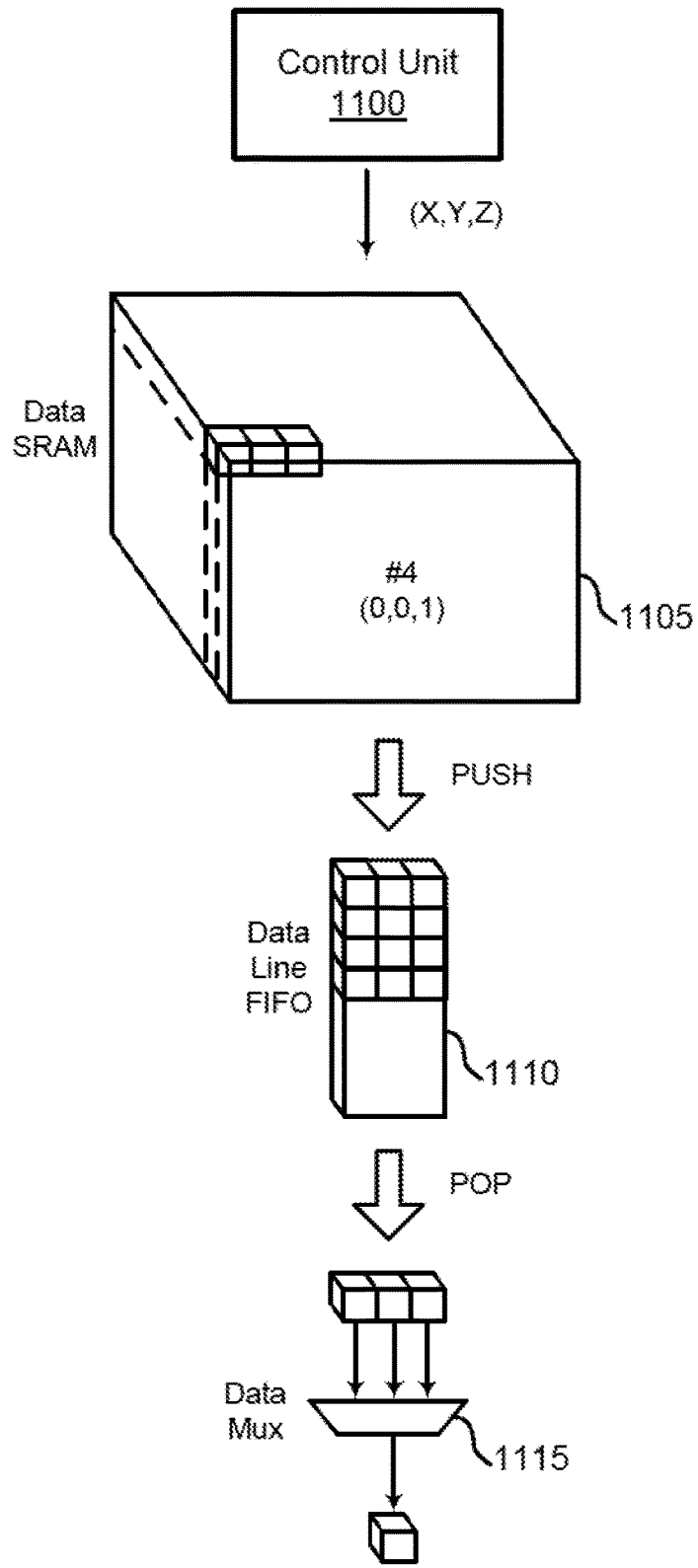
FIG. 11 shows an example of a data control line in accordance with aspects of the present disclosure.

FIG. 11 shows an example of a data control line in accordance with aspects of the present disclosure (i.e., a Data Multiplexing line). The data control line shown in FIG. 11 may correspond to the data control unit 740, the data RAM 745 and the MAC Unit 760 described with reference to FIG. 7. The example shown includes control unit 1100, data SRAM 1105, data line buffer 1110, and data multiplexing buffer 1115.

The position control unit 1100 calculates the 3D coordinates of the next line to fetch from the input data and filter tensors, according to the line scanning sequence. Given the 3D coordinates, the lines are read from the data SRAM 1105 and are stored in a data line buffer 1110. Then, lines are popped one after the other from the buffer. Finally, a data multiplexing buffer 1115 selects the specific values from the popped line, one by one, in a left to right order and the selected value is being processed.

Control unit 1100 may be an example of, or include aspects of, the corresponding element or elements described with reference to FIGS. 6, 9, 10, and 12, or of the data control unit 740. Data line buffer 1110 may be an example of, or include aspects of, the corresponding element or elements described with reference to FIG. 12, or of data RAM 745.

Figure 12:
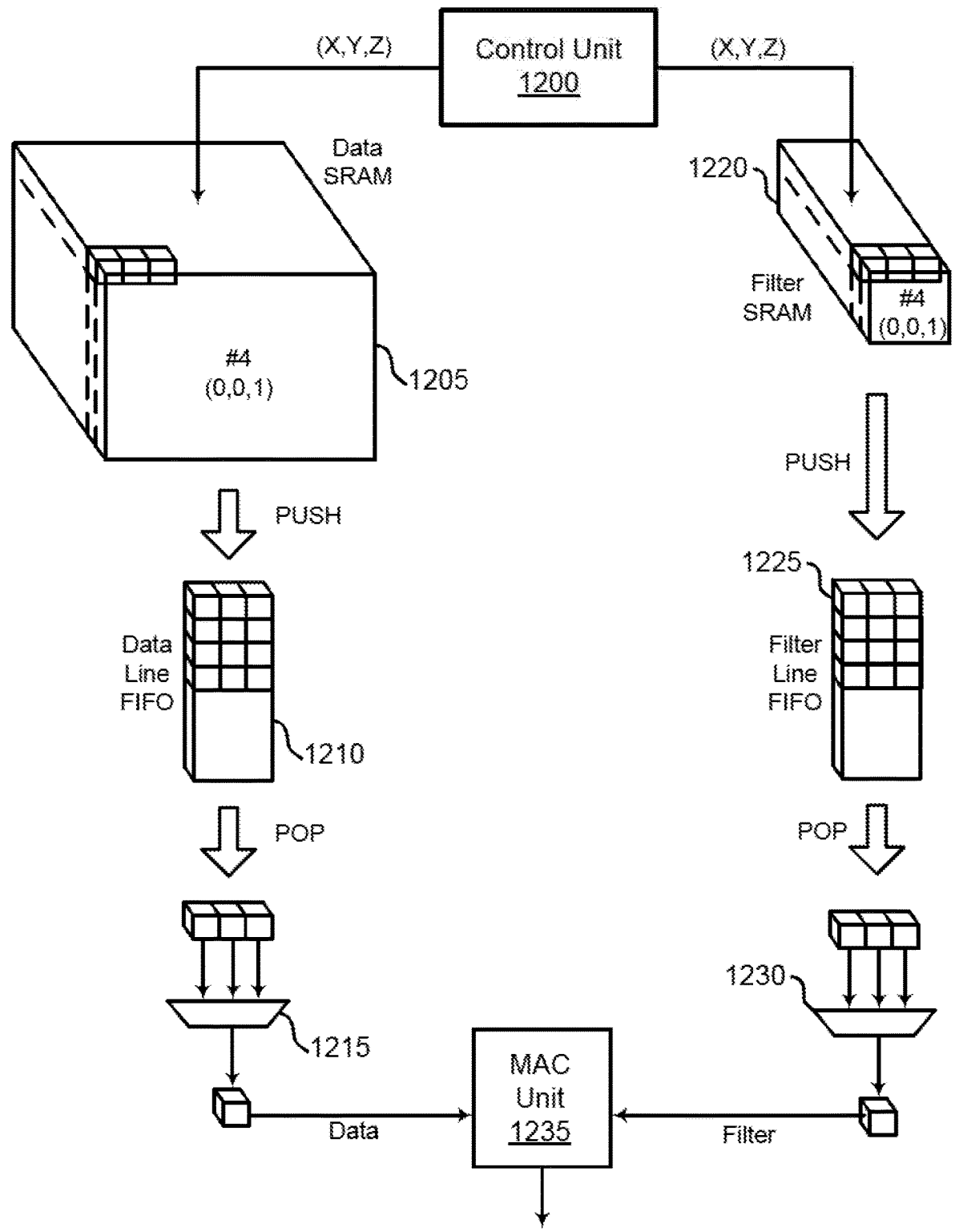
FIG. 12 shows an example of a data and filter control mechanism in accordance with aspects of the present disclosure.

FIG. 12 shows an example of a data and filter control mechanism in accordance with aspects of the present disclosure (i.e., Data & Filter Multiplexing lines). The example shown includes control unit 1200, data RAM 1205, data line buffer 1210, data multiplexing buffer 1215, filter RAM 1220, filter line buffer 1225, filter multiplexing buffer 1230, and MAC unit 1235. The data and filter control mechanism may be an example of components performing the data and filter control according to the pathways described above with reference to FIG. 7.

Data values and filter weights are fetched simultaneously by the filter and the input data control logic. At each cycle, the MAC unit 1235 receives one input data value and one filter weight value, multiplies them and accumulates the product. In a parallel system with multiple MAC units 1235, vectors of corresponding pairs of input values and filter values may be fetched and processed simultaneously.

Control unit 1200 may be an example of, or include aspects of, the corresponding element or elements described with reference to FIGS. 6, and 9-11. Data RAM 1205 may be an example of, or include aspects of, the corresponding element or elements described with reference to FIG. 7. Data line buffer 1210 and data multiplexing buffer 1215 may be examples of, or include aspects of, the corresponding elements described with reference to FIG. 11. Filter RAM 1220 may be an example of, or include aspects of, the corresponding element or elements described with reference to FIG. 7. MAC units 1235 may be an example of, or include aspects of, the corresponding element or elements described with reference to FIGS. 6 and 7.

Figure 13:
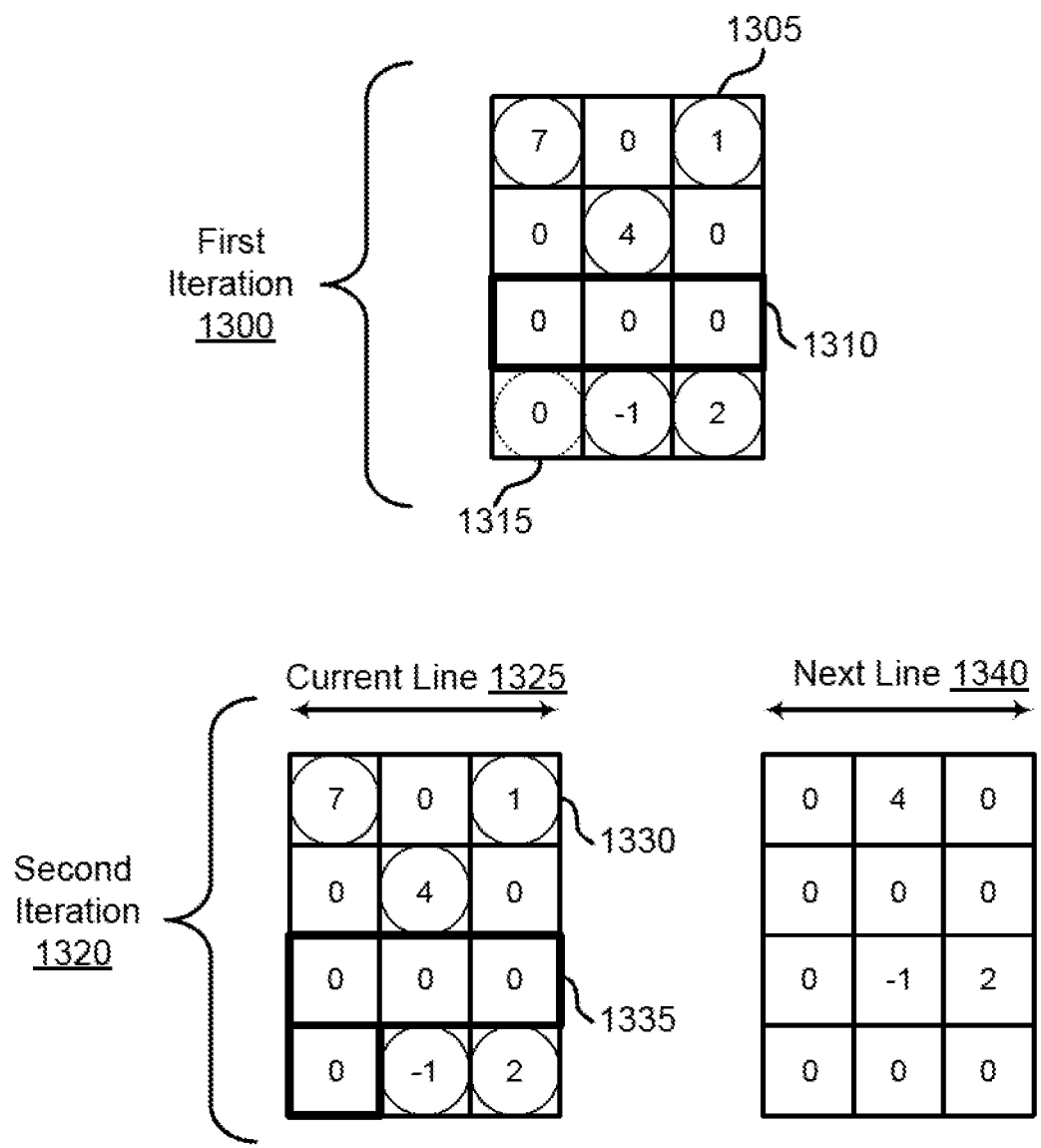
FIG. 13 shows an example of a process for zero-skipping in mixed channels in accordance with aspects of the present disclosure.

FIG. 13 shows an example of a process for zero-skipping in mixed channels in accordance with aspects of the present disclosure. The example shown includes first iteration 1300 and second iteration 1320. First iteration 1300 may include at least one non-zero value 1305, skipped zeroes 1310, and a processed zero 1315. Second iteration 1320 may include current line 1325 and next line 1340. First iteration 1300 shows an example that results in processing a zero (i.e., processed zero 1315), and second iteration 1320 shows an example that avoids processing a zero.

In example embodiments, zero-skipping may be implemented synchronously for zero weights and corresponding input data values using the same control mechanism. For mixed channels including 2D channels with both zero and non-zero weights, the zero-skipping control may be implemented by the X-ctrl block. At every cycle, the X_ctrl block looks simultaneously at all weights in two filter lines in the FIFO buffer (i.e., the current line 1325 being processed by the MAC block, and the next line 1340, as shown in second iteration 1320).

All weights are compared to zero—this is the look-ahead operation. Given the results of these compare-to-zero operations, there are three options. First, if the current line 1325 still contains an unprocessed non-zero weight (located in the range from the currently processed weight position, to the right, until the rightmost position in the line), then no line is popped, and the current line 1325 in the multiplexing buffer will be processed on the next cycle. Second, if there are no unprocessed non-zero weights until the end of the current line 1325, but the next line 1340 contains non-zero values, then the next line 1340 is popped, the weights are copied to the multiplexing buffer, and will be processed in the next cycle. Third, if both the remaining weights in the current line 1325 and all weights in the next line 1340 are zeros, then the next line 1340 is skipped, and instead the line after it is popped and copied to the muxed-buffer.

The compare-to-zero operations implemented by the X_ctrl block may also generate an x_pos signal that contains the position on the next non-zero value (if it exists) in the muxed-buffer. This may be true unless the next line 1340 was detected to include only zeros, and was skipped. In this case, the line after the next line 1340 may be popped without a look-ahead operation, and the x-pos signal indicates the first (leftmost) position by default. This position may contain a zero. This case may represent a failure of the zero-skipping mechanism as a cycle is being wasted on a non-required processing of zero weight.

The buffer size of the FIFO lines involved in the zero-skipping operation may be relatively small. This may help to reduce the chip area size and the power consumption of the CA. If there are many parallel control systems, or large MAC arrays, the savings can highly significant. The structured pruning method described herein may enable a CA with a small buffer size to operate efficiently by nearly eliminating the cases of zero in the first location that was described above. This may ensure full utilization of the CA with non-zero weight computations. However, that this may come at price of some accuracy degradation of the ANN after it is structurally-pruned to avoid the zero-skipping failure events. Thus, the degradation is a function of the look-ahead constrained imposed but letting the X_cntl to 'see' only the current and next lines. Relaxing the constraint, e.g. by allowing the CA to look-ahead to more lines, may allow the pruning algorithm to choose different set of weights to be pruned in the convolution filters. This will be reflected in higher accuracy of the pruned ANN. So given a fixed pruning rate, there is a trade-off between the size of the look-ahead mechanism and the accuracy of the ANN after being pruned by the algorithm.

In accordance with the description above, the first iteration 1300 shows an example of a process to implement zero-skipping that results in processing a zero value (i.e., an undesirable result). In this example, each line consists of 3 filter weights. At any given execution cycle, the X_ctrl block "sees" the current line and the next line in the Line FIFO. After the 3rd cycle is calculated (the value 4 on the second row), the next line is all zeros (i.e., skipped zeroes 1310), so the controller skips to the beginning of the 4th line and lands on a zero value (i.e., processed zero 1315) that potentially could have been skipped. The filter shown in first iteration 1300 was chosen for the purpose of demonstrating the zero-skipping operation and is typically not and outcome of hierarchical pruning algorithm, which may be configured to avoid this outcome.

Second iteration 1320 shows an example of a process to implement zero-skipping that avoids processing a zero value. One method of relaxing the constraints of the hierarchical pruning algorithm is to double the FIFO buffer size and increase the logical 'look-ahead' of X_cntl. To illustrate the process of the second iteration 1320, the weights of the next line 1340 are shown to the right hand side of the current line 1325 in the Line FIFO. With this duplication the logic 'sees' one line further down the FIFO and is able to skip each of the skipped zeroes 1335 (i.e., without processing a zero).

Thus, using the same example filter as in first iteration 1300, the weights selected for processing are different. That is, on completion of the third calculation (i.e., of value 4 on the second row), we see in the next line 1340 the values −1, and 2. This allows the controller to skip two lines instead of one, pop the line (0, −1, 2) and choose the value −1 to be processed on the next cycle. In other words, the zero-skipping failure was prevented using the LHP constraint with a limit of two rows. Accordingly, the pruning algorithm will not try to fix this pruning structure by unpruning, which results in an ANN with higher quality. Additional lines can be added to farther increase the CA look-ahead scope and relax the constraints for the pruning algorithm.

Next referring to FIGS. 14 and 15, processes are shown depicting a generalization of the process for pruning an ANN as illustrated by the specific example described with reference to FIG. 4.

Figure 14:
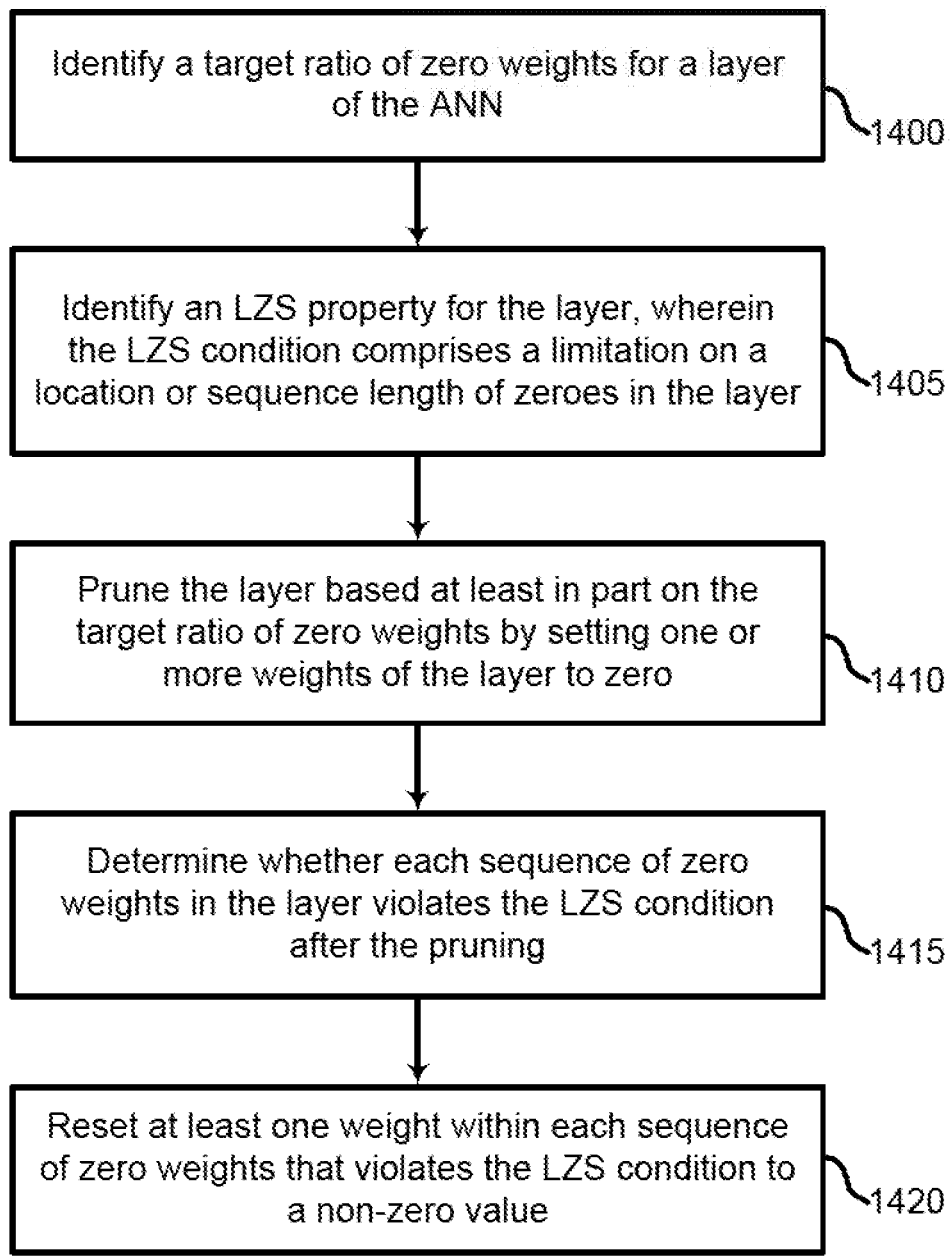
FIGS. 14 through 15 show examples of a process for pruning an ANN in accordance with aspects of the present disclosure.

FIG. 14 shows an example of a process for pruning an ANN in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1400, the system may identify a target ratio of zero weights for a layer of the ANN. In some cases, the operations of this step may refer to, or be performed by, a pruning component as described with reference to FIG. 5.

At step 1405, the system may identify an LZS condition for the layer, wherein the LZS condition comprises a limitation on a location or sequence length of zeroes in the layer. In some cases, the operations of this step may refer to, or be performed by, a Limited zero-skipping component as described with reference to FIG. 5.

At step 1410, the system may prune the layer based at least in part on the target ratio of zero weights by setting one or more weights of the layer to zero. In some cases, the operations of this step may refer to, or be performed by, a pruning component as described with reference to FIG. 5.

At step 1415, the system may determine whether each sequence of zero weights in the layer violates the LZS condition after the pruning. In some cases, the operations of this step may refer to, or be performed by, a pruning component as described with reference to FIG. 5.

At step 1420, the system may reset at least one weight within each sequence of zero weights that violates the LZS condition to a non-zero value (i.e., to prevent violation of the LZS condition). In some cases, the operations of this step may refer to, or be performed by, a pruning component as described with reference to FIG. 5. The pruning and resetting of values may be performed as described above with reference to FIG. 4.

Figure 15:
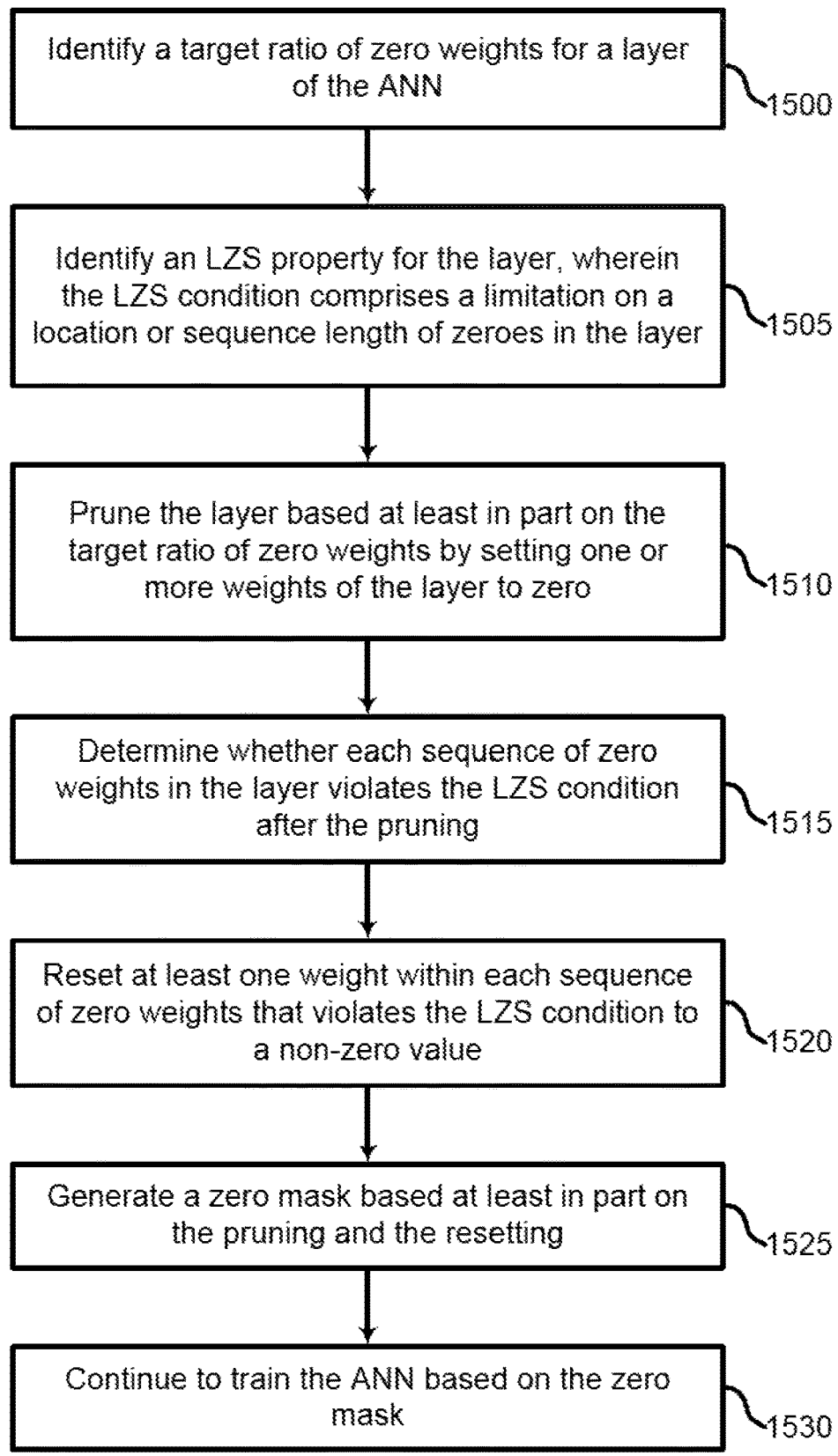

FIG. 15 shows an example of a process for pruning an ANN in accordance with aspects of the present disclosure. FIG. 15 shows an example that includes the steps described above with reference to FIG. 14, with the additional steps of training the ANN based on a zero mask generated as a result of the pruning.

At step 1500, the system may identify a target ratio of zero weights for a layer of the ANN. In some cases, the operations of this step may refer to, or be performed by, a pruning component as described with reference to FIG. 5.

At step 1505, the system may identify an LZS condition for the layer, wherein the LZS condition comprises a limitation on a location or sequence length of zeroes in the layer. In some cases, the operations of this step may refer to, or be performed by, a Limited zero-skipping component as described with reference to FIG. 5.

At step 1510, the system may prune the layer based at least in part on the target ratio of zero weights by setting one or more weights of the layer to zero. In some cases, the operations of this step may refer to, or be performed by, a pruning component as described with reference to FIG. 5.

At step 1515, the system may determine whether each sequence of zero weights in the layer violates the LZS condition after the pruning. In some cases, the operations of this step may refer to, or be performed by, a pruning component as described with reference to FIG. 5.

At step 1520, the system may reset at least one weight within each sequence of zero weights that violates the LZS condition to a non-zero value. In some cases, the operations of this step may refer to, or be performed by, a pruning component as described with reference to FIG. 5.

At step 1525, the system may generate a zero mask based at least in part on the pruning and the resetting. In some cases, the operations of this step may refer to, or be performed by, a pruning component as described with reference to FIG. 5.

At step 1530, the system may continue to train the ANN based on the zero mask. In some cases, the operations of this step may refer to, or be performed by, a training component as described with reference to FIG. 5.

Figure 16:
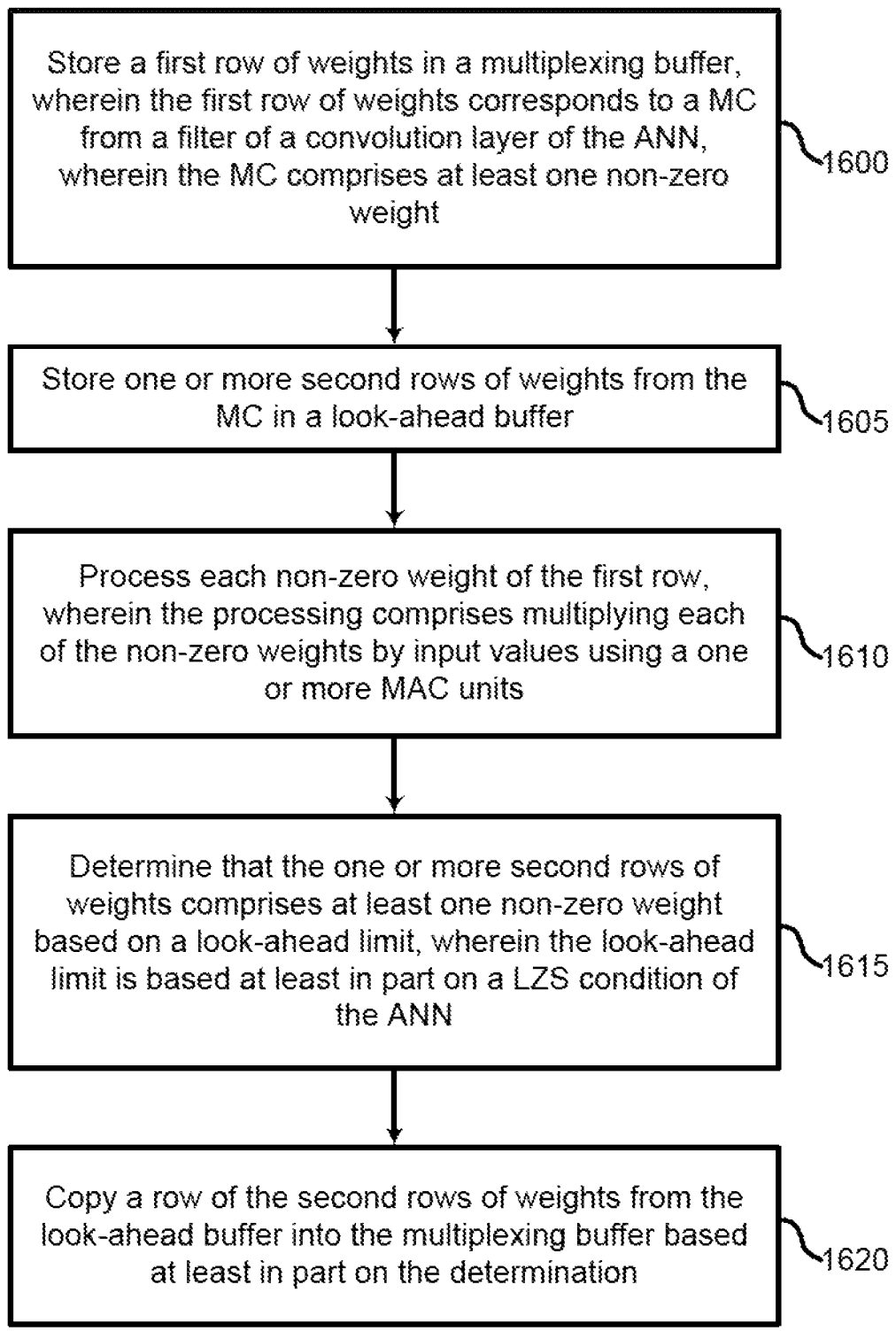
FIG. 16 shows an example of a process for zero-skipping while processing an ANN in accordance with aspects of the present disclosure.

FIG. 16 shows an example of a process for zero-skipping while processing an ANN in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

As discussed above with reference to FIG. 4, structured pruning is done with consideration of how the zeros will later be skipped by a zero-skipping method, and incorporates the limitations of such methods. That is, different zero-skipping methods may be constrained by different types of limitations. For example, zero-skipping may be performed based on a limited zero sequence (LZS) condition. Some types of LZS constraints limit both the length and location of zero sequence. A family of structural constraints, the limited hardware prediction (LHP) structure, may be based on hardware limitations of a CA for processing the ANN.

For example, consider a 3D filter F of size $X_F \times Y_F \times Z$. Given any position $p=(x_0, y_0)$ in the filter, let $q=(x, y)$ be the next position (in some known order of scanning the weights in the filter) with non-zero weight. Then $y \leq y_0 + \Delta_y \cdot \Delta_y$ is a parameter of the LHP.

The LHP constraint may derived from the limitations of a specific zero-skipping control mechanism for MCs such as in the CA described herein. For MCs, a processor or convolution accelerator (CA) uses a look-ahead buffer to search the next non-zero weight to be processed. Searching and processing of non-zero weights may be done in a fixed order, e.g. top-left to bottom-right, where the top left coordinate is (1,1). One option is to consider all MCs sequentially. For example, for a 3×3×Z filter this means that during processing the first line of the second MC filter has coordinate y=4 as it directly follows the third line of the first filter. The other option is to consider each 2D MC independently. For the 3×3×Z we then count lines from 1 to 3 in each channel. The choice depends on the implementation of the AC, and the structured LHP constraint that is derived from it. In the examples below we use a sequential count of the lines.

The $\Delta_y$ parameter corresponds to the size of the look-ahead buffer and the related control logic of the zero-skipping mechanism. If, for example, $\Delta_y=1$, it means that the next non-zero value is on the currently processed line $y=y_0$ or the next line $y=y_0+1$. That is, the look-ahead logic searches the current and next line, but not beyond that. $\Delta_y=0$ means that the search is done only in the current line. The MC at z=0 of FIG. 3 shows a filter example where the constraint with $\Delta_y=1$ does not hold, since for position $p=(1,1)$, with weight 9, the next non-zero is 8, in location $q=(2,3)$. However, the constraint with parameter $\Delta_y=2$ holds.

A hierarchical 3D filter model may be characterized by combining sparsity in two levels. First, at the FPC level, pruning may be accomplished at low resolution, i.e., some channels include only zero weights. Second, at the MC level, pruning may be done with a finer resolution, i.e., other MCs combine non-zeros with limited sequences of zeros.

In some cases, the specific type of LZS in MCs may be derived based on the design and limitations of the processor (i.e., when using the LHP structural constraint). In some cases, a pruning algorithm may implement structured pruning with the combination of FPC and HP (or any other type of LZS). This may enable high pruning rates with only small degradation in ANN accuracy performance. An efficient CA may process an ANN pruned with FPCs based on the LZS (e.g., the LHP). As the filter structure is tuned in advance to meet the hardware limitations, the zero-skipping mechanism skips nearly 100% of the zero weights without losing time, while being very small and power efficient.

At step 1600, the system may store a first row of weights in a multiplexing buffer, wherein the first row of weights corresponds to a MC from a filter of a convolution layer of the ANN, wherein the MC comprises at least one non-zero weight. In some cases, the operations of this step may refer to, or be performed by, a multiplexing buffer as described with reference to FIG. 6.

At step 1605, the system may store one or more second rows of weights from the MC in a look-ahead buffer. In some cases, the operations of this step may refer to, or be performed by, a look-ahead buffer as described with reference to FIG. 6.

At step 1610, the system may process each non-zero weight of the first row, wherein the processing comprises multiplying each of the non-zero weights by input values using a one or more MAC units. In some cases, the operations of this step may refer to, or be performed by, a MAC unit as described with reference to FIGS. 6, 7, and 12.

At step 1615, the system may determine that the one or more second rows of weights comprises at least one non-zero weight based on a look-ahead limit, wherein the look-ahead limit is based at least in part on an LZS condition of the ANN. In some cases, the operations of this step may refer to, or be performed by, a zero-skipping circuit as described with reference to FIG. 6.

At step 1620, the system may copy a row of the second rows of weights from the look-ahead buffer into the multiplexing buffer based at least in part on the determination. In some cases, the operations of this step may refer to, or be performed by, a zero-skipping circuit as described with reference to FIG. 6.

Figure 17:
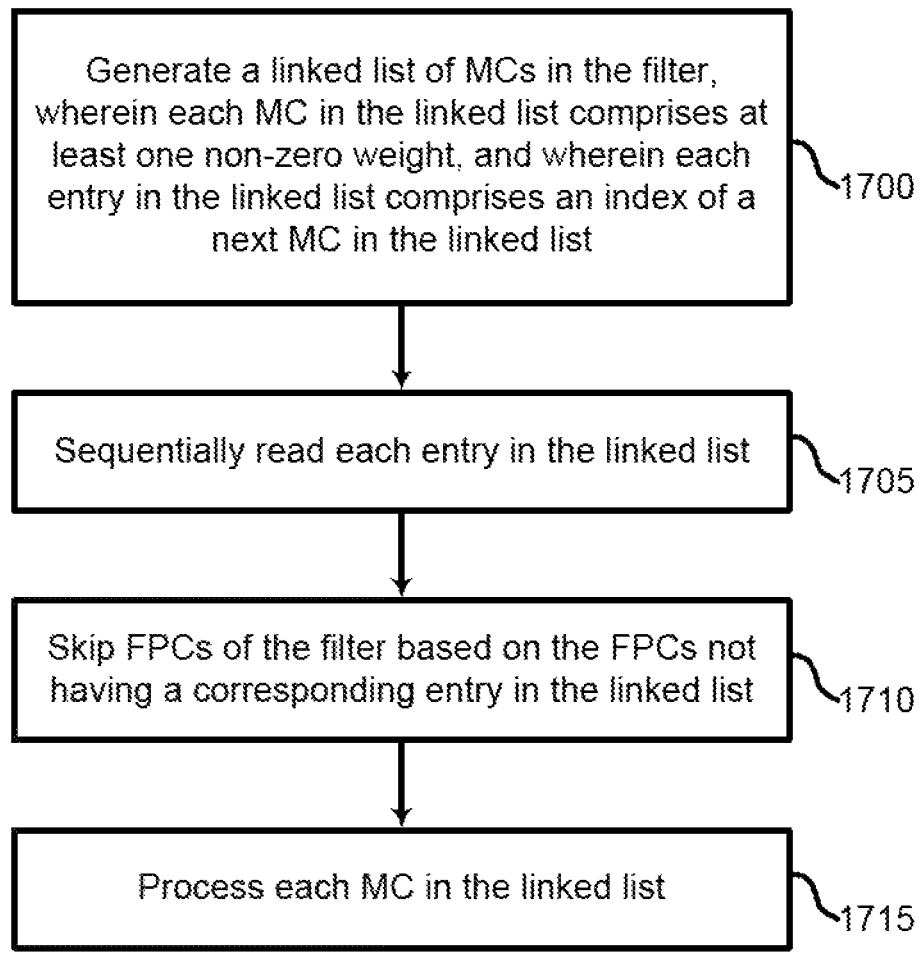
FIG. 17 shows an example of a process for skipping fully pruned channel (FPCs) while processing an ANN in accordance with aspects of the present disclosure.

FIG. 17 shows an example of a process for skipping FPCs while processing an ANN in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

Various methods may be used to achieve persistency of sparse convolution filters pruned hierarchically with FPC and LZS. One option is to keep all weights of MCs, including zeros, in the order it should be processed. The MCs may be arranged in a linked list. After each MC of known size (e.g. 3×3, as illustrated in FIG. 3) a 'step' value is kept, indicating the difference between the indices of the current and next MC in the 3D filter, as shown on the next figure. While processing, the CA uses the step value and calculates the index of the processed MC in the filter s shown in table 1 below. FPCs are omitted in the table as they would be in the linked list.

TABLE 1

| The Step Values for MCs of FIG. 3 | |
|---|---|
| Z Value | Step Value |
| 0 | 1 |
| 1 | 4 |
| 5 | 2 |
| 7 | 0 |

Thus, at step 1700, the system may generate a linked list of MCs in the filter, wherein each MC in the linked list comprises at least one non-zero weight, and wherein each entry in the linked list comprises an index of a next MC in the linked list. In some cases, the operations of this step may refer to, or be performed by, a control unit as described with reference to FIGS. 6, and 9-12.

At step 1705, the system may sequentially read each entry in the linked list. In some cases, the operations of this step may refer to, or be performed by, a control unit as described with reference to FIGS. 6, and 9-12.

At step 1710, the system may skip an FPC of the filter based on the FPC not having a corresponding entry in the linked list. In some cases, the operations of this step may refer to, or be performed by, a control unit as described with reference to FIGS. 6, and 9-12.

At step 1715, the system may process each MC in the linked list.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A computing system for processing an artificial neural network (ANN), comprising:
a processor comprising a zero-skipping circuit configured to process a maximal number of weights in a single cycle and to locate non-zero weights;
a memory; and
an ANN stored within the memory, wherein the ANN comprises a plurality of layers including one or more convolution layers, wherein each of the one or more convolution layers comprises a plurality of filters, each filter comprises a plurality of channels, each channel comprises a plurality of rows, and each row comprises a plurality of weights,
wherein at least one non-zero weight that is greater than zero and below a pruning threshold is added to at least one of the plurality of channels to satisfy a limited zero sequence (LZS) condition that limits a number or location of sequential zero weights in the one or more plurality of channels based on the maximal number of weights the zero-skipping circuit is configured to process in the single cycle, and
wherein the at least one non-zero weight corresponds to at least one weight of the one or more plurality of channels that was pruned based on the pruning threshold.

2. The computing system of claim 1, wherein:
the at least one non-zero weight is pruned from the one or more plurality of channels based on the pruning threshold and re-inserted to satisfy the LZS condition.

3. The computing system of claim 1, wherein:
the LZS condition comprises a maximum number of rows over which zero sequences extend.

4. The computing system of claim 3, wherein:
the maximum number of rows is two.

5. The computing system of claim 1, wherein:
the zero-skipping circuit is configured to skip zero weights based on the maximal number of weights the zero-skipping circuit is configured to process in a single cycle.

6. The computing system of claim 1, wherein:
the one or more convolution layers comprises at least 33% zero weights.

7. The computing system of claim 1, wherein:
the one or more fully pruned channels (FPCs) comprise at least 20% of channels in the one or more convolution layers.

8. The computing system of claim 1, wherein:
the portion of the one or more plurality of channels comprise at least 95% of the one or more plurality of channels.

9. The computing system of claim 1, wherein:
the LZS condition is based at least in part on a scanning order of the computing system.

10. The computing system of claim 9, wherein:
the LZS condition applies to sequences of consecutive zero weights over more than one channel according to the scanning order of the computing system.

11. The computing system of claim 1, wherein:
the ANN further comprises one or more fully connected layers that satisfy the LZS condition.

12. The computing system of claim 1, further comprising:
a control unit configured to identify and skip fully pruned channel (FPCs) of the ANN.

13. The computing system of claim 1, further comprising:
the zero-skipping circuit is further configured to evaluate a fixed number of lines in a look-ahead buffer and copy a line of weights to a multiplexing buffer based on the evaluating.

14. The computing system of claim 1, further comprising:
the maximum number of weights depends on a size of a buffer which is configured to store weights to be processed.

15. The computing system of claim 1, wherein the plurality of channels are iteratively pruned and unpruned based on the pruning threshold and a target pruning rate.

* * * * *